US006804885B2

(12) United States Patent
Kishima

(10) Patent No.: US 6,804,885 B2
(45) Date of Patent: Oct. 19, 2004

(54) METHOD FOR MANUFACTURING PRINTER DEVICE

(75) Inventor: Koichiro Kishima, Kanagawa (JP)

(73) Assignee: Sony Corporation, Tokyo (JP)

(*) Notice: Subject to any disclaimer, the term of this patent is extended or adjusted under 35 U.S.C. 154(b) by 160 days.

(21) Appl. No.: 10/141,234

(22) Filed: May 8, 2002

(65) Prior Publication Data

US 2002/0133948 A1 Sep. 26, 2002

Related U.S. Application Data

(62) Division of application No. 09/033,749, filed on Feb. 26, 1998, now Pat. No. 6,401,316.

(30) Foreign Application Priority Data

Feb. 28, 1997 (JP) .......................................... P9-046662

(51) Int. Cl.$^{7}$ ......................... B21D 53/76; B23P 17/00; H04R 17/00; B41J 2/165

(52) U.S. Cl. ....................... 29/890.1; 29/25.35; 29/592; 347/29; 347/37

(58) Field of Search ............................ 29/890.1, 25.35, 29/592, 592.1, 593, 594, 602.1, 603.18, 27, 47, 52, 72–78, 105–109, 232, 232.1, 293, 294, 603.01, 603.13, 603.16; 347/29, 37, 111; 427/100, 189, 191, 192; 264/129, 131, 162; 216/11, 27, 47, 52, 72–78, 105–109

(56) References Cited

U.S. PATENT DOCUMENTS 3,202,094 A * 8/1965 Smallman ...................... 430/5
3,989,964 A 11/1976 Gikow et al. ................ 310/8.1
4,373,018 A * 2/1983 Reichmanis et al. ........ 430/312
4,545,625 A 10/1985 Engwall ..................... 308/5 R
4,666,315 A 5/1987 Scranton ........................ 384/1
4,680,595 A * 7/1987 Cruz-Uribe et al. .......... 347/40
4,732,717 A 3/1988 Yanagida et al. ............. 264/22
5,134,334 A 7/1992 Onishi et al. ............... 310/323
5,173,630 A 12/1992 Tanaka ....................... 310/316
5,220,171 A 6/1993 Hara et al. .................. 250/443
5,220,538 A 6/1993 Flanagan et al. ........... 367/157
5,235,135 A 8/1993 Knecht et al. ............ 174/52.3
5,347,712 A * 9/1994 Yasuda et al. ................ 29/852
5,459,501 A * 10/1995 Lee et al. ..................... 347/68
5,729,264 A * 3/1998 Pankert et al. ................ 347/71
5,790,156 A * 8/1998 Mutton et al. ................ 347/71
5,801,733 A * 9/1998 Pankert ........................ 347/72
5,802,686 A * 9/1998 Shimada et al. ........... 29/25.35
5,894,185 A 4/1999 Asada et al. ................ 310/368
5,906,481 A 5/1999 Ogawa et al. .............. 417/413
6,334,244 B2 * 1/2002 Hashizume ................ 29/25.35
6,609,785 B2 * 8/2003 Hashizume et al. .......... 347/70

FOREIGN PATENT DOCUMENTS

JP 06-063865 * 3/1994

* cited by examiner

*Primary Examiner*—John M. Hotaling, II
*Assistant Examiner*—Binh-An D. Nguyen
(74) *Attorney, Agent, or Firm*—Sonnenschein, Nath & Rosenthal LLP

(57) ABSTRACT

A method for splitting a piezoelectric device used in substitution for dicing for shortening the processing time as compared to a case of using the dicing to improve productivity to enable the shape of the piezoelectric device more suited to the emission shape of a solution to be achieved, and a method for manufacturing a printer device whereby a narrower nozzle pitch may be achieved. A resist 201 is formed at a pre-set position on a major surface of the piezoelectric device 43 bonded to a vibrating plate. Using this resist 201 as a mask, powders or particles are sprayed onto the piezoelectric device 43 for removing the portion of the piezoelectric device 43 not carrying the resist 201 to form the piezoelectric device 35 of a desired shape at a pre-set position.

1 Claim, 22 Drawing Sheets

FIG.9A
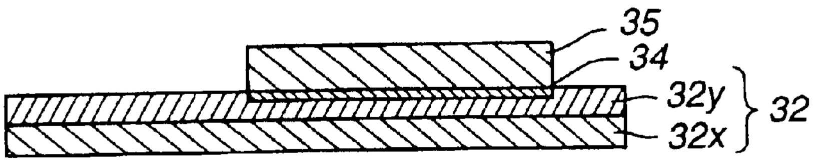
FIG.9B
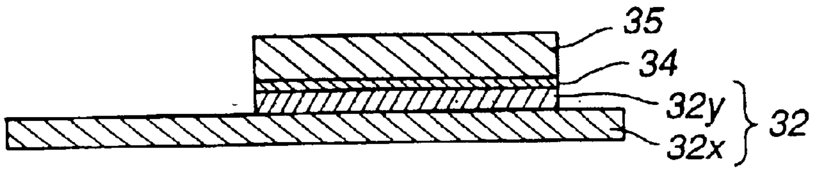
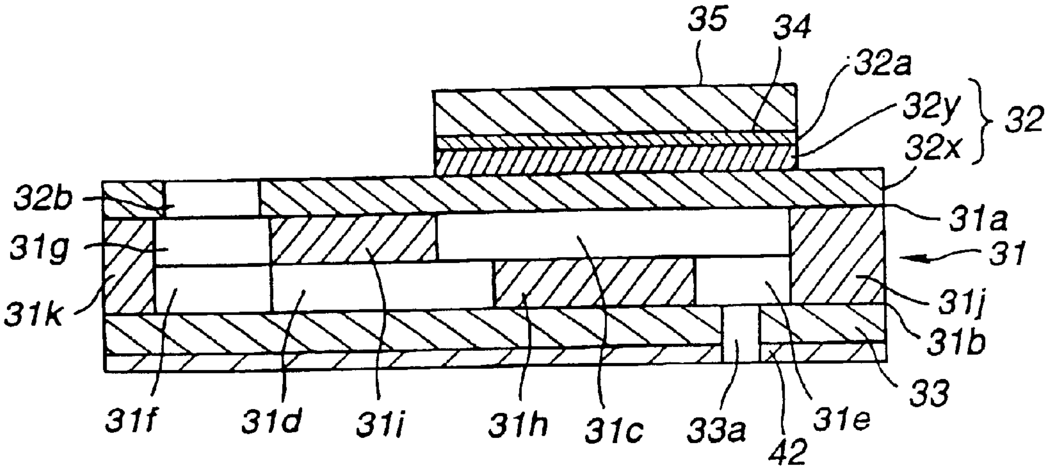
FIG.10A
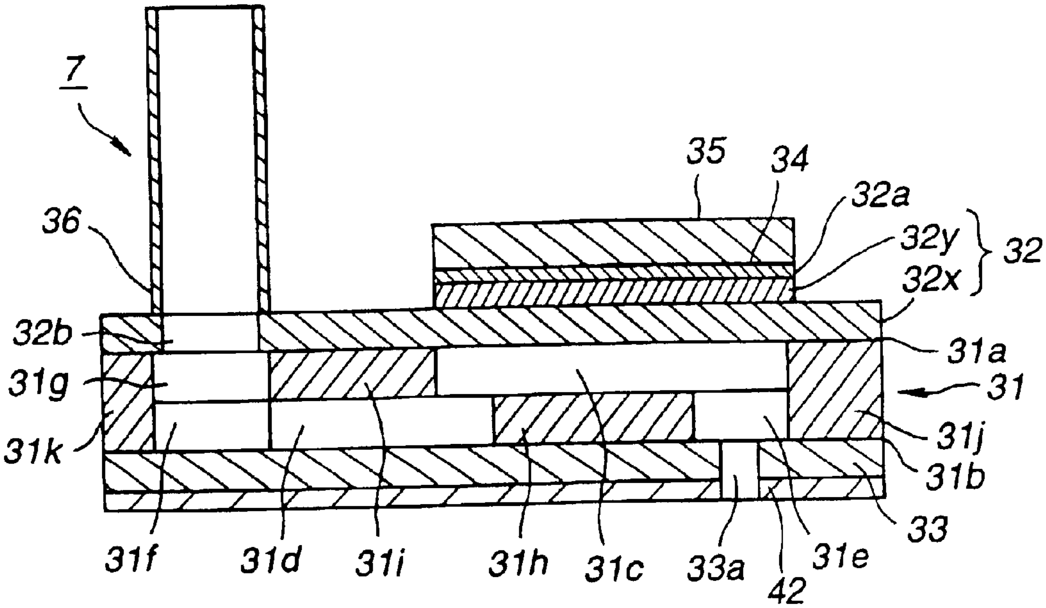
FIG.10B

METHOD FOR MANUFACTURING PRINTER DEVICE

This application is a divisional of application Ser. No. 09/033,749, issued as U.S. Pat. No. 6,401,316, filed Feb. 26, 1998. The present and foregoing applications claim priority to Japanese application No. P09-046662 filed Feb. 28, 1997. All of the foregoing applications are incorporated herein by reference to the extent permitted by law. This application is related to copending application Ser. No. 10/142,281, which is a divisional of application Ser. No. 09/033,749.

BACKGROUND OF THE INVENTION

1. Field of the Invention

This invention relates to a method for manufacturing a printer device, such as a method for manufacturing a printer device applied to an on-demand ink jet printer device (termed herein simply an ink jet printer device), or an on-demand carrier jet printer device (termed herein simply a carrier jet printer device).

2. Description of Related Art

Heretofore, this type of the ink jet printer device is such a printer device in which ink liquid droplets are emitted via an ink emission hole responsive to a recording signal for printing an image on recording mediums, such as paper sheets or films. The ink jet printer device is recently coming into widespread use because it lends itself to reduction in size and cost.

In this ink jet printer device, a method employing a heating element and a method employing a piezoelectric device is customarily used as a method for emitting ink liquid droplets.

The method employing the heating element emits the ink liquid droplets via an ink emission hole under a pressure of bubbles generated on heating the ink by the heating element to ebullition.

The method employing the piezoelectric device deforms the piezoelectric device to pressurize an ink pressurizing chamber charged with the ink to emit ink liquid droplets at the ink emission hole via ink entry holes formed in the ink pressurizing chamber.

This method employing the piezoelectric device may be enumerated by a method of linearly displacing a layered piezoelectric device made up of three or more piezoelectric devices bonded to a vibrating plate for thrusting the ink pressurizing chamber via the vibrating plate, and a method of applying a voltage across a single-layer piezoelectric device or double-layer piezoelectric devices bonded to the vibrating plate to warp the vibrating plate to thrust the ink pressurizing chamber.

In the latter method, that is the method of applying a voltage across a single-layer piezoelectric device or double-layer piezoelectric devices bonded to the vibrating plate to warp the vibrating plate to thrust the ink pressurizing chamber, an expensive layered piezoelectric device is not used, so that the manufacturing costs can be lowered. This method, however, has a drawback that fine pitch is difficult to realize at the time of bonding the sliced single-layer piezoelectric device or double-layered piezoelectric devices to the vibrating plate. Moreover, if a paste-like piezoelectric material is applied to the vibrating plate, such as by coating, and fired to produce a piezoelectric device, the firing temperature of not less than 1000° C. is difficult to set, in view of thermal resistance proper to the vibrating plate, such that characteristics of the piezoelectric material cannot be exhibited sufficiently.

In addition, if, after bonding the piezoelectric material to the vibrating plate, the piezoelectric material is cut to plural piezoelectric devices, the piezoelectric material is difficult to cut to a constant depth at all times, due to abrasion of cutting tools or processing tolerances of machine tools, thus occasionally damaging the vibrating plate.

For overcoming the above problems, the present Assignee proposed in Japanese patent Application Nos. 7-193366, 7-1922201 and 7-190750 an inexpensive ink jet printer head employing a single-layer or double-layer piezoelectric device, in which the printing process can be stabilized and characteristics of the piezoelectric material can be exhibited while the fine pitch can be coped with.

However, the method for splitting the piezoelectric material disclosed in the above-referenced publications is such a method in which the piezoelectric material bonded on the vibrating plate by an electrically conductive adhesive is split by a dicing device, that is such a method in which a rotating blade is in a stationary position and a work, that is a piezoelectric device, is set on a stage and moved in this state in a one-dimensional direction, that is lineally, as shown in FIG. 1. Thus, the processing shape is limited to a linear shape such that the shape of the piezoelectric device after splitting is comprised of linear sides.

Since the site that can be machined by each stage movement is determined by the number of the rotating blades, the number of piezoelectric devices that can be obtained by splitting is governed by the number of blades that can be driven at a time, such that tens of piezoelectric devices cannot be obtained at a time by splitting.

On the other hand, the spacing per piezoelectric device obtained by dicing is broader by approximately tens of micrometers than the width of the blade used for dicing, so that, if the blade 50 $\mu$m in width is used, the spacing is limited to approximately 70 $\mu$m. Also, if the width of the blade used for dicing is reduced to the smallest value possible, the amount of abrasion of the dicing blade is increased, as a result of which the blade width needs to be set to not smaller than 100 $\mu$m and hence the spacing of the split piezoelectric devices needs to be set to not smaller than 120 $\mu$m, such that the desired narrow pitch cannot be achieved.

SUMMARY OF THE INVENTION

It is therefore an object of the present invention to provide a splitting method which may be used in place of dicing for the splitting process of the piezoelectric devices and to provide a method for manufacturing a printer device in which the processing time can be shortened as compared to the splitting method by dicing, the shape of the piezoelectric device more suited to the liquid emitting shape can be realized in place of the linear shape that can be achieved with the conventional method, and in which the spacing between piezoelectric devices can be set so as to be narrower than the blade width.

The method for manufacturing the printer device according to the present invention resides in forming a resist at a pre-set position on a major surface of the piezoelectric device bonded to a vibrating plate. Using this resist as a mask, powders or particles are sprayed onto the piezoelectric device for removing the portion of the piezoelectric device not carrying the resist to enable the piezoelectric device of a desired shape to be formed at a pre-set position.

With the present manufacturing method for the printer device, since the number or the shape of the piezoelectric devices produced depends only on the resist distribution, a large number of the piezoelectric devices can be produced simultaneously to shorten the processing time to improve productivity. Moreover, the piezoelectric device of an optional shape may be manufactured.

In addition, with the preset manufacturing method, the separation between neighboring piezoelectric devices can be easily comprised within the width of not more than 10 $\mu$m, while the nozzle pitch may be reduced.

Also, with the present manufacturing method for the printer device, abrasion to the tool need not be taken into account when manufacturing the piezoelectric device, so that more emphasis can be placed on the ink emission performance in designing.

Further, with the present manufacturing method for the printer device, substantially the entire surface of the piezoelectric material bonded on the vibrating plate can be processed thus significantly reducing the working time.

BRIEF DESCRIPTION OF THE DRAWINGS

FIGS. 6A and B illustrate the operation of the ink jet printer head of the printer device, wherein FIG. 6A is a longitudinal cross-sectional view showing the state in which the ink pressurizing chamber is increased in volume and FIG. 6B is a longitudinal cross-sectional view showing the state in which the ink pressurizing chamber is decreased in volume.

FIGS. 7A, B, C, D and E illustrate the manufacturing process for the ink jet printer head of the printer device, wherein FIG. 7A is a longitudinal cross-sectional view showing the state in which a resist has been formed on a metal member.

FIGS. 8A, 8B, 8C, 8D and 8E illustrate the manufacturing process for an ink jet printer head of the printer device, wherein FIG. 8A is a longitudinal cross-sectional view showing the state in which the piezoelectric material has been bonded to the vibrating plate, FIG. 8B is a longitudinal cross-sectional view showing the state in which a resist having a pre-set pattern has been formed on the major surface of the piezoelectric material, FIG. 8C is a longitudinal cross-sectional view showing the state in which a powders have been sprayed using the resist as a mask, FIG. 8D is a longitudinal cross-sectional view showing the state in which etching has been effected using the resist as a mask for removing the second vibrating plate and FIG. 8D is a longitudinal cross-sectional view showing the state in which the resist has been removed using the solution for removal.

FIGS. 9A and 9B illustrate the manufacturing method for the ink jet printer head of the printer device, wherein FIG. 9A is a longitudinal cross-sectional view showing the state in which the piezoelectric device has been formed on a vibrating plate and FIG. 9B is a longitudinal cross-sectional view showing the state in which the second vibrating plate has been removed by etching using the piezoelectric device as a mask.

FIGS. 10A and 10B illustrate the manufacturing process for an ink jet printer head of the printer device, wherein FIG. 10A is a longitudinal cross-sectional view showing the state in which a vibrating plate carrying the piezoelectric device has been bonded to a pressurizing chamber forming member and FIG. 10B is a longitudinal cross-sectional view showing the state in which an ink supply duct has been mounted in position.

FIGS. 17A, 17B and 17C illustrate the operation of the 'carrier jet' printer head of the printer device, wherein FIG. 17A is a longitudinal cross-sectional view showing a initial state, FIG. 17B is a longitudinal cross-sectional view showing the state in which the ink pressurizing chamber has been decreased in volume and FIG. 17C is a longitudinal cross-sectional view showing the state in which a dilution liquid pressurizing chamber has been decreased in volume.

FIGS. 18A, 18B, 18C, 18D and 18E illustrate the manufacturing process for the 'carrier jet' printer head of the printer device, wherein FIG. 18A is a longitudinal cross-sectional view showing the state in which a resist has been formed on a metal member, FIG. 18B is a longitudinal cross-sectional view showing the state in which etching has been effected using the resist as a mask, FIG. 18C is a longitudinal cross-sectional view showing the state in which a resin material has been bonded to a metal member freed of the resist, FIG. 18D is a longitudinal cross-sectional view showing the state in which a repellant liquid film has been formed on the resin material and FIG. 18E is a longitudinal cross-sectional view showing the state in which an ink emission hole and a dilution liquid emission hole have been formed in the resin material and in the liquid repellant films.

FIGS. 19A, 19B, 19C, 19D and 19E illustrate the manufacturing process of the 'carrier jet' printer head of the printer device, wherein FIG. 19A shows the state in which a piezoelectric material has been bonded to a vibrating plate, FIG. 19B shows the state in which a resist having a pre-set pattern has been formed on the major surface of the piezoelectric material, FIG. 19C shows a state in which powders have been sprayed using the resist as a mask to form a piezoelectric device, FIG. 19D shows a state in which the second vibrating plate has been removed by etching using the piezoelectric device as a mask and FIG. 19E shows a state in which the resist has been removed using a removing solution.

FIG. 20A and 20B illustrate the manufacturing process for the 'carrier jet' printer head of the printer device, wherein FIG. 20A shows the state in which the piezoelectric device has been formed on the vibrating plate and FIG. 20B shows a state in which the second vibrating plate has been removed by etching using the piezoelectric device as a mask.

FIGS. 21A and 21B illustrate the manufacturing process for the 'carrier jet' printer head of the printer device, wherein FIG. 21A is a longitudinal cross-sectional view showing the state in which a vibrating plate carrying a piezoelectric device has been bonded to a pressurizing chamber forming member and FIG. 21B is a longitudinal cross-sectional view showing the state in which an ink supply duct and a dilution liquid supply duct have been mounted in position.

FIGS. 22A, 22B, 22C and 22D illustrate a manufacturing process for a printer device according to an modification of the present invention, wherein FIG. 22A is a longitudinal cross-sectional view showing the state in which a vibrating plate carrying a piezoelectric material has been bonded to a pressurizing chamber forming member, FIG. 22B is a longitudinal cross-sectional view showing the state in which a resist has been formed on the piezoelectric material, FIG. 22C is a longitudinal cross-sectional view showing the state in which the piezoelectric device has been formed and FIG. 22D is a longitudinal cross-sectional view showing the state in which the ink supply duct has been mounted in position.

DESCRIPTION OF PREFERRED EMBODIMENTS

Figure 1:
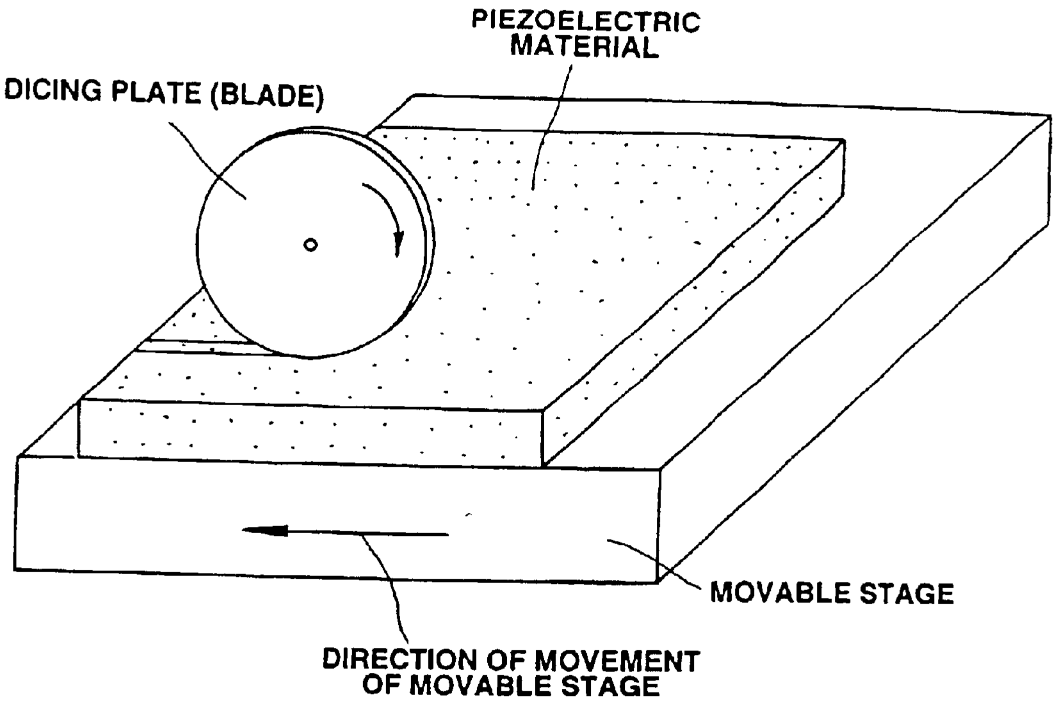
FIG. 1 is a perspective view showing the state of forming a piezoelectric device by dicing for illustrating the conventional manufacturing method for a printer device.

Referring to the drawings, preferred embodiments of the present invention will be explained in detail.

First Embodiment

In the first embodiment, the present invention is applied to a serial type ink jet printer device.

Figure 2:
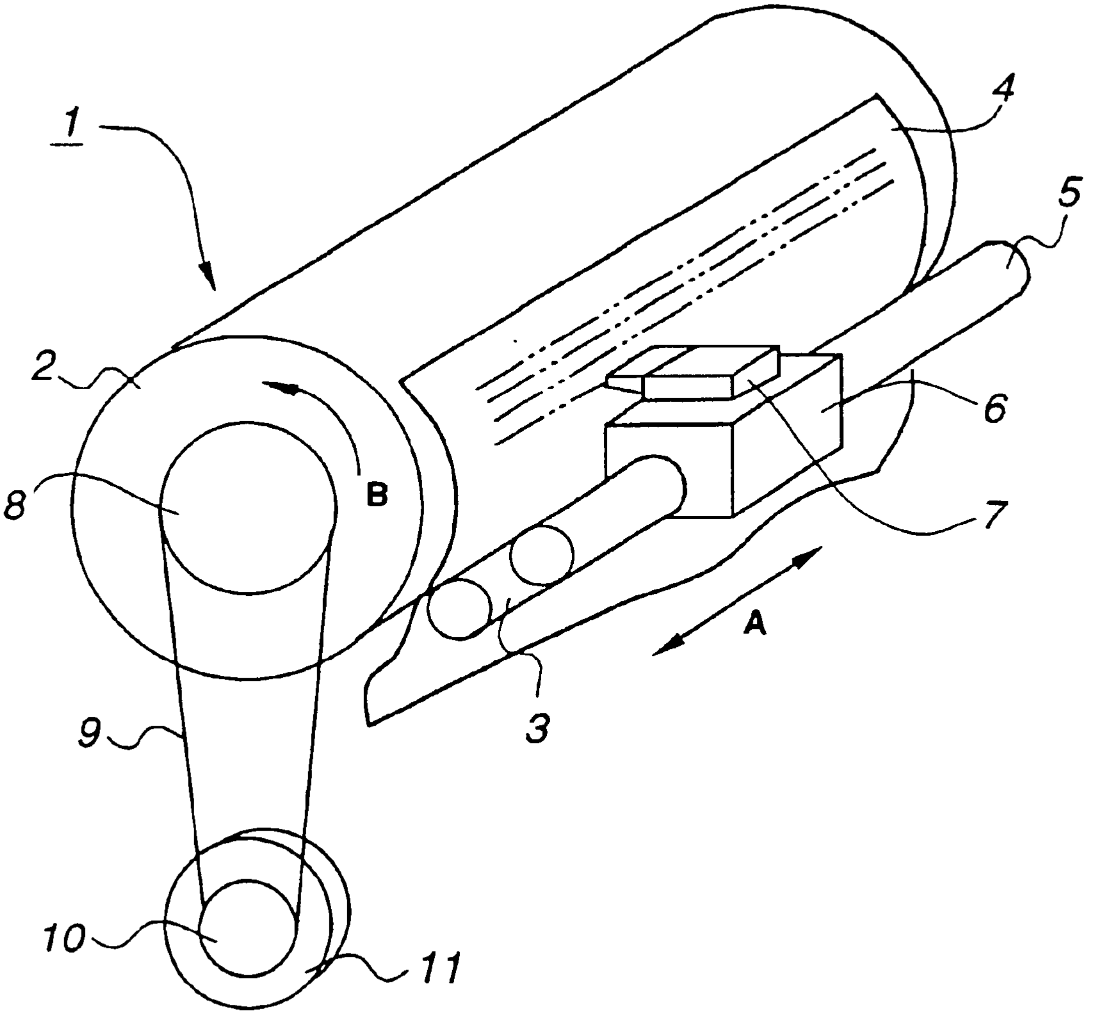
FIG. 2 is a perspective view showing essential parts of a serial type ink jet printer device according to a first embodiment of the present invention.

A serial type ink jet printer device 1, abbreviated to a printer device 1, has a cylindrically-shaped drum 2, on the outer periphery of which a paper sheet pressing controller 3 is mounted in position parallel to the drum 2, as shown in FIG. 2. The printer device 1 clamps a printing paper sheet 4, as a printing support, by the drum 2 and the paper sheet pressing controller 3, for stationarily pressing the printing paper sheet 4 to the drum 2.

At a small separation from the outer periphery of the drum 2 of the printer device 1 is mounted a feed screw 5 parallel to the drum 2. On this feed screw 5 is mounted an ink jet print head 7 via a supporting member 6 meshing with the feed screw 5. By rotation of the feed screw 5, the ink jet print head 7 is moved along the axis of the drum 2 indicated by arrow A in FIG. 2 along with the supporting member 6 meshing with the feed screw 5.

The drum 2 is operatively linked with a motor 11 via a first pulley 8, a belt 9 and a second pulley 10 so as to be rotated in a direction of arrow B in FIG. 2 by rotation of the motor 11.

Figure 3:
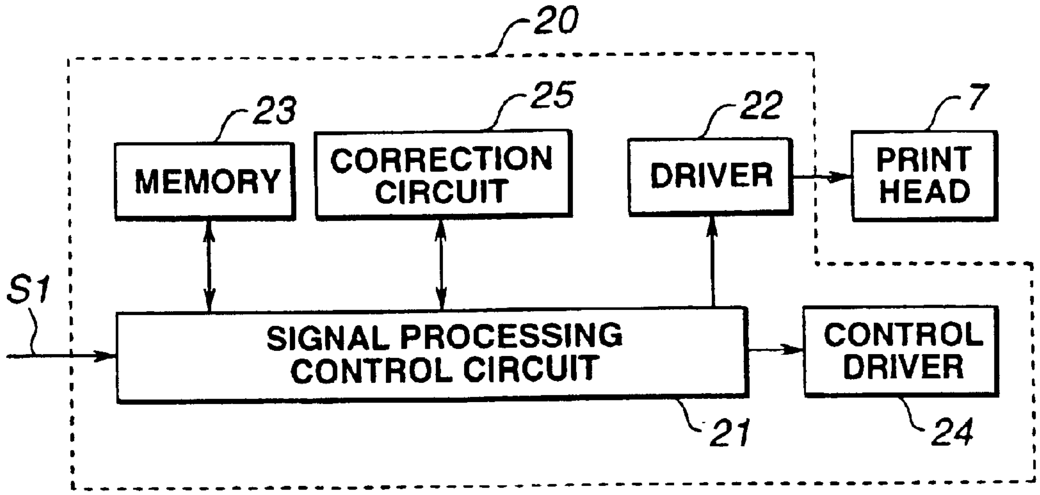
FIG. 3 illustrates the structure of a controller of the printer device.

The printer device 1 is controlled by a controller 20, as shown in FIG. 3. The controller 11 is made up of a signal processing control circuit 21, a driver 22, a memory 23, a driving controller 24 and a correction circuit 25. The signal processing control circuit 21 is comprised of a central processing unit (CPU) or a digital signal processor (DSP) and, on reception from outside of letter printing data, signals of an operating unit and external control signals, as an input signal S1, sorts the letter printing data in the letter printing sequence and sends out the sorted letter printing data along with an emission signal via driver 22 to the ink jet print head 7 for driving-controlling the ink jet print head 7.

In this case, the letter printing sequence differs with difference in structure of the ink jet print head 7 and the letter printing section and, moreover, needs to be considered in connection with the inputting sequence of the letter printing data. Therefore, the letter printing sequence is transiently stored in a memory 23 comprised of a buffer memory or a frame memory for later reading.

The signal processing control circuit 21 is designed to process the input signal S1 by software and sends out processed signals as control signals to a driving controller 24.

On reception of the control signals sent from the signal processing control circuit 21, the driving controller 24 controls the driving or synchronization of the motor adapted for rotationally driving the motor 11 and the feed screw 5, while also controlling the cleaning of the ink jet print head 7 and supply or ejection of the printing paper sheet 4.

If the printer device 1 is of a multiple-head construction, the signal processing control circuit 21 performs γ-correction, color correction in case of color printing and correction of variations of the ink jet print heads 7 by a correction circuit 25. In this correction circuit 25, pre-set correction data are stored in the form of a ROM (read-only memory) map, so as to be read out by the signal processing control circuit 21 depending on external conditions, such as ink emission hole number, temperature or input signals.

If the printer device 1 is of a multiple head structure, such that there are a large number of ink emission holes, an IC (integrated circuit) is mounted on the ink jet print head 7 for reducing the number of interconnections to the ink jet print head 7.

In the above-described printer device 1, the motor is run in rotation by the driving controller 24 responsive to the control signals sent from the signal processing control circuit 21 for rotating the feed screw 5. On rotation of the feed screw 5, the ink jet print head 7 of the printer device 1 is moved axially of the drum 2, along with the supporting member 6, as the ink is emitted, for printing letters or the like on the printing paper sheet 4 pressed to the drum 2. The printing direction in which the ink jet print head 7 effects printing on the printing paper sheet 4 as it is moved axially of the drum 2 may be the same direction or the reciprocating direction.

In the printer device 1, when the ink jet print head 7 is moved axially of the drum 2 to print letters of one row on the printing paper sheet 4, the motor 11 is run in rotation under control by the driving controller 24 to rotate the drum 2 by one row in a direction of arrow B in FIG. 2 in readiness for printing of the next row of letters.

Next, the ink jet print head 7 is explained.

Figure 4:
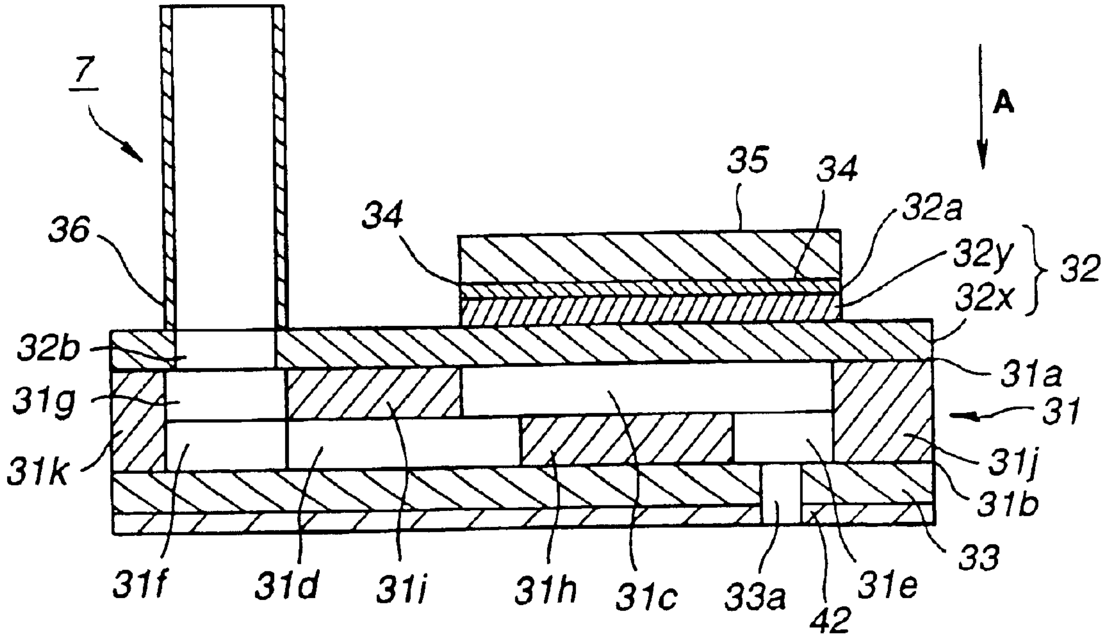
FIG. 4 is a longitudinal cross-sectional view of an ink jet printer head of the printer device.

In the ink jet print head 7, shown in FIG. 4, a vibrating plate 32 is bonded to a major surface 31*a* of a plate-shaped ink pressurizing chamber forming member 31, whilst a plate-shape orifice plate 33 is bonded to the opposite side major surface 31*b* of the ink pressurizing chamber forming member 31. In the ink jet print head 7, a piezoelectric device 35 is bonded via an electrically conductive adhesive 34 to the major surface 32*a* of the vibrating plate 32 of the double-layered structure. Around a portion of the orifice plate 33 in which is opened an ink emission hole 33*a* as later explained is formed a liquid repellant film 42.

The ink pressurizing chamber forming member 31 is constituted by a metal plate of e.g., stainless steel, with a thickness of approximately 0.1 mm. This ink pressurizing chamber forming member 31 is formed with an ink pressurizing chamber 31*c* for pressurizing the ink charged therein at a pre-set pressure, an ink flow duct 31*d* communicating with one end of the ink pressurizing chamber 31*c* for supplying ink into the ink pressurizing chamber 31*c*, an ink inlet duct 31*e* formed at the opposite end of the ink pressurizing chamber 31*c* for operating as a through-hole via which to conduct ink charged into the ink pressurizing chamber 31*c* to the ink emission hole 33*a*, an ink buffer tank 31*f* for delivery of the ink to the ink flow duct 31*d* and a connection hole 31*g* for conducting the ink supplied from an ink supply duct 36 into the ink buffer tank 31*f*.

The ink pressurizing chamber 31*c* is formed for extending from a mid portion in the direction of thickness of the ink pressurizing chamber forming member 31 towards the major surface 31*a* of the ink pressurizing chamber forming member 31. The ink inlet duct 31*e* is formed on the opposite end of the ink pressurizing chamber 31*c* for extending from the mid portion in the direction of thickness of the ink pressurizing chamber forming member 31 towards the opposite side major surface 31*b* of the ink pressurizing chamber forming member 31.

Similarly to the ink inlet duct 31*e*, the ink flow duct 31*d* is formed for extending from the mid portion in the direction of thickness of the ink pressurizing chamber forming member 31 towards its opposite side major surface 31*b*. This ink flow duct 31*d* is separated from the ink inlet duct 31*e* via a first member 31*h* as later explained. Also, the ink flow duct 31*d* is formed so that a portion of the first member 31*h* communicates with one end of the ink pressurizing chamber 31*c*.

Figure 5:
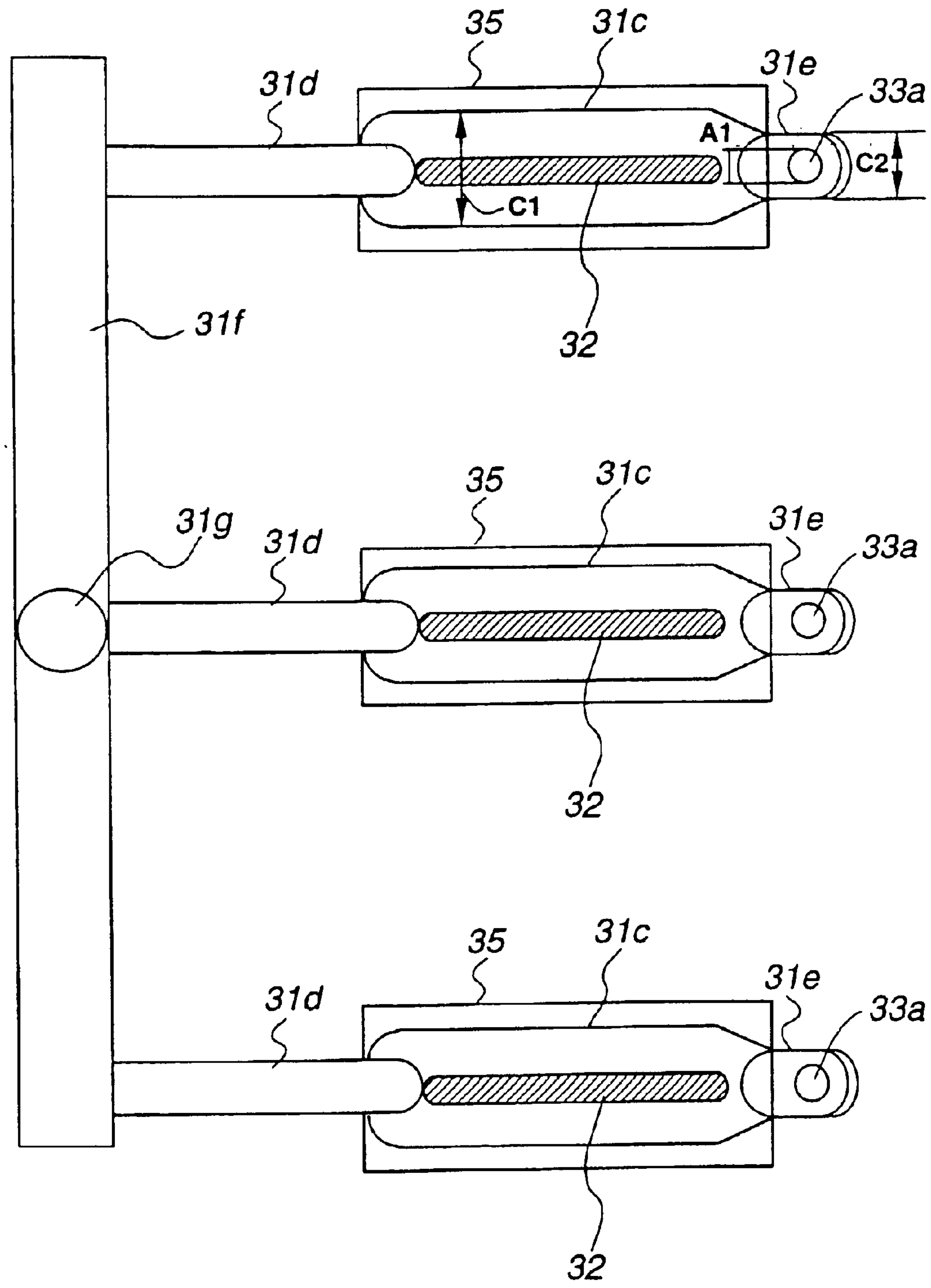
FIG. 5 is a plan view schematically showing an ink jet printer head of the printer device.

Similarly to the ink inlet duct 31*e* and the ink flow duct 31*d*, the ink buffer tank 3 if is formed for extending from the mid portion in the direction of thickness of the ink pressurizing chamber forming member 31 towards its opposite side major surface 31*b*. It is noted that the ink buffer tank 31*f* is a sole straight-shaped piping communicating with plural ink flow ducts 31*d*, as shown in FIG. 5, and performs the role of distributing the ink to the various ink flow ducts 31*d*.

The connection hole 31*g* is formed from a mid portion along the thickness of the ink pressurizing chamber forming member 31 to the major surface 31*a* of the member 31 for communication with the ink buffer tank 31*f*.

The ink pressurizing chamber forming member 31 is made up of a first member 31*h*, a second member 31*i*, a third member 31*j* and a fourth member 31*k*. The first member 31*h*, constituting the bottom surface of the ink pressurizing chamber 31*c* and a portion of the opposite side major surface 31*b* of the ink pressurizing chamber forming member 31, is contacted with a lateral side of the ink inlet duct 31*e* and with a lateral surface of the ink flow duct 31*d* to separate the ink inlet duct 31*e* from the ink flow duct 31*d*. The second member 31*i* is contacted with one lateral surface of the ink pressurizing chamber 31*c* and with one lateral surface of the connection hole 31*g* to separate the ink pressurizing chamber 31*c* from the connection hole 31*g*. The third member 31*j* is contacted with the opposite side lateral surface of the ink pressurizing chamber 31*c* and the opposite side lateral surface of the ink inlet duct 31*e* and constitutes the major surface 31*a* and a portion of the major surface 31*b* of the ink pressurizing chamber forming member 31. The fourth member 31*k* is contacted with the lateral surface of the ink buffer tank 31*f* and the opposite side lateral surface of the connection hole 31*g* and constitutes the major surface 31*a* and a portion of the major surface 31*b* of the ink pressurizing chamber forming member 31. The spacing areas or voids delimited by these first to fourth members 31*h* to 31*k* are constituted as the ink pressurizing chamber 31*c*, ink inlet duct 31*e*, ink flow duct 31*d*, ink buffer tank 31*f* and as the connection hole 31*g*.

On the opposite side major surface 31*b* of the ink pressurizing chamber forming member 31 is bonded an orifice plate 33, by thermal pressure bonding, for covering the ink inlet duct 31*e*, ink flow duct 31*d* and the ink buffer tank 31*f*. The orifice plate 33 is formed of Neoflex (manufactured by MITSUI TOATSU KAGAKU KOGYO KK) excellent in thermal resistance and in resistance against chemicals and having a thickness of approximately 50 μm and a glass transition temperature of not higher than 250° C.

This orifice plate 33 is formed with an ink emission hole 33*a* having a cross-sectional shape of a column of, for example, a pre-set diameter. The ink emission hole 33*a* communicates with the ink inlet duct 31*e* for emitting the ink supplied from the ink pressurizing chamber 31*c* via the ink inlet duct 31*e*. By having the orifice plate 33 formed with the ink emission hole 33*a*, it is possible to assure chemical stability against the ink.

The piezoelectric device 35 is formed to a shape in meeting with the shape of the ink pressurizing chamber 31*c*, as shown in FIG. 5. The separation from the neighboring piezoelectric device 35 is set to not larger than 100 μm.

The ink pressurizing chamber 31*c* is designed so that its width C2 at the site of the ink inlet duct 31*e* is smaller than the main width C1 of the ink pressurizing chamber 31*c* and is larger than the opening diameter A1 towards the ink inlet duct 31*e* of the ink emission hole 33*a*. More specifically, if the main width C1 of the ink pressurizing chamber 31*c* is set to 0.4 mm to 0.6 mm, the width C2 at the site of the ink inlet duct 31*e* of the ink pressurizing chamber 31*c* is of the order of 0.2 mm equal to approximately twice the plate thickness of the pressurizing chamber forming member 31. The width C2 at the site of the ink inlet duct 31*e* of the ink pressurizing chamber 31*c* is preferably not more than 2.5 times the plate thickness of the pressurizing chamber forming member 31.

The ink emission hole 33*a* is formed for communicating with approximately the mid portion of the ink inlet duct 31*e*. The ink emission hole 33*a* is tapered in the direction of ink emission. In the present embodiment, the opening end of the ink emission hole 33*a* has a circular cross-sectional shape approximately 5 μm in diameter, whilst the cross-sectional shape thereof towards the ink pressurizing chamber forming member 31 is circular with the diameter approximately 80 μm. Thus, the width C2 at the site of the ink inlet duct 31*e* of the ink pressurizing chamber 31*c* is smaller than the main width C1 of the ink pressurizing chamber 31*c* and larger than the opening diameter A1 towards the ink inlet duct 31*e* of the ink emission hole 33*a*.

On the major surface 31*a* of the ink pressurizing chamber forming member 31 is bonded a double-layered vibrating plate 32, via an adhesive, for closing the opening portion of the ink pressurizing chamber 31*c*. The opening portion of the ink pressurizing chamber 31*c* means an area of the ink pressurizing chamber forming member 31 opening in the major surface 31*a*.

The vibrating plate 32 is of a double-layered structure comprised of a first vibrating plate 32*x* positioned towards the ink pressurizing chamber 31*c* for closing all opening portions of the ink pressurizing chamber 31*c* and a second vibrating plate 32*y* shaped in meeting with the piezoelectric device 35 formed on the vibrating plate 32.

This vibrating plate 32 is formed with a through-hole 32*b* in register with the connection hole 31*g* of the ink pressurizing chamber forming member 31. In this through-hole 32*b* is fitted an ink supply duct 36 connected to an ink tank, not shown. Therefore, the ink introduced from the ink tank is supplied via the ink supply duct 36 and the ink buffer tank 31*f* into the ink flow duct 31*d* and thence into the ink pressurizing chamber 31*c*.

In the double-layered vibrating plate 32, the first vibrating plate 32*x* is formed of Neoflex (manufactured by MITSUI TOATSU KAGAKU KOGYO KK) having excellent thermal resistance and resistance against chemicals, a thickness of approximately 50 μm and a glass transition temperature of not higher than 250° C. The second vibrating plate 32*y* is a copper plate having a thickness of approximately 15 μm.

On the major surface of the second vibrating plate 32*y* is bonded the piezoelectric device 35 via an electrically conductive adhesive 34. Although the vibrating plate 32 in the present embodiment is of a double-layered structure comprised of the first vibrating plate 32*x* and the second vibrating plate 32*y*, the vibrating plate 32 may be of a single-layered structure, or of a multi-layered structure comprised of three or more layers.

Figure 6A:
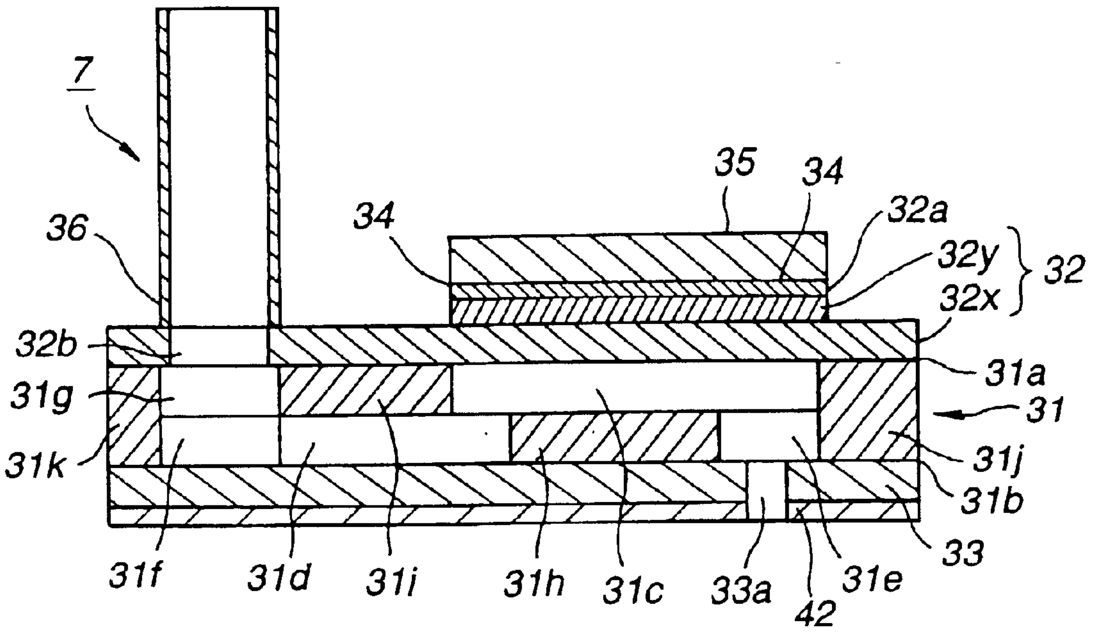
Figure 6B:
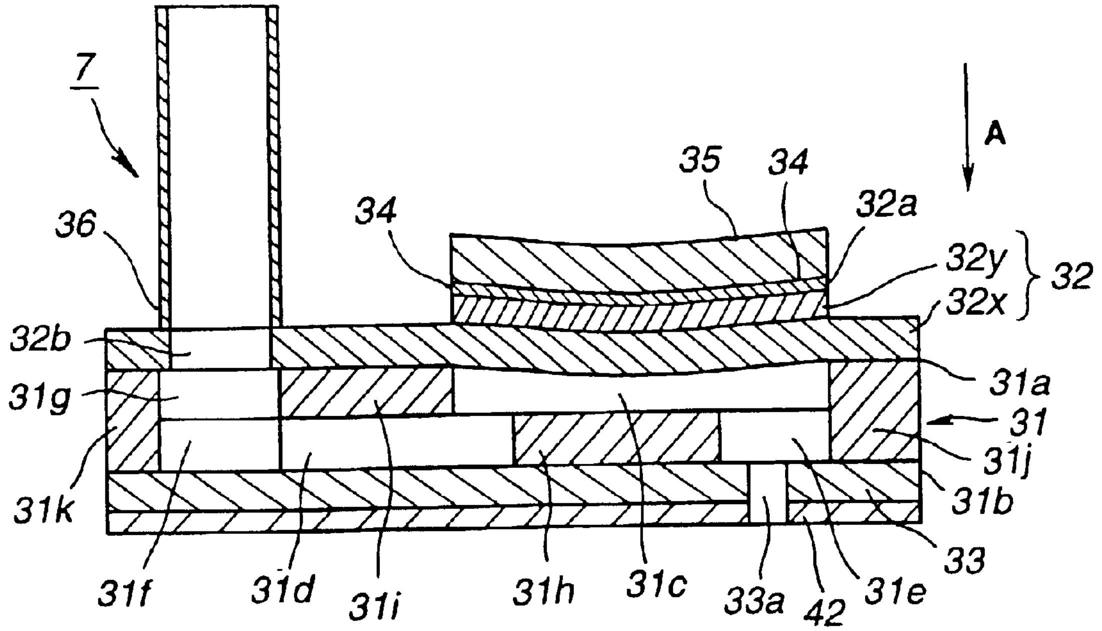

When a driving voltage is applied across the piezoelectric device 35, in a state shown in FIG. 6A, it is displaced in a direction indicated by arrow A in FIG. 6B to warp the vibrating plate 32 to decrease the volume of the ink pressurizing chamber 31*c* to raise the pressure in the ink pressurizing chamber 31*c*.

The ink jet print head 7 operates as follows:

In the stand-by state, the ink charged into the ink pressurizing chamber 31*c* is in a stabilized state, by equilibrium with surface tension, with a meniscus being formed in the vicinity of the distal end of the ink emission hole 33*a*, as shown in FIG. 6A.

For ink emission, the driving voltage is applied across the piezoelectric device 35 for thereby displacing the device 35 in a direction indicated by arrow A in FIG. 6B. This displacement of the vibrating plate 32 decreases the volume of the ink pressurizing chamber 31*c* to raise the pressure therein to emit the ink via the ink emission hole 33*a*. It is noted that time changes of the driving voltage applied to the piezoelectric device 35 are set so that a desired amount of the ink will be emitted via the ink emission hole 33*a*.

The manufacturing method of the ink jet print head 7 will be explained with reference to FIGS. 7 to 10. First, in FIG. 7A, a resist, such as a photosensitive dry film or a liquid resist material, is coated on the major surface 38*a* of the metal member 38 of, for example stainless steel, approximately 0.1 mm thick. Then, pattern light exposure is effected, using a mask patterned in meeting with the ink pressurizing chamber 31*c* and the connection hole 31*g*, and a resist such as a photosensitive dry film or a liquid resist material is coated on the opposite major surface 38*b* of the metal member 38. Then, pattern light exposure is carried out using a mask patterned in meeting with the ink inlet duct 31*e*, ink flow duct 31*d* and the ink buffer tank 31*f*.

Figure 7A:
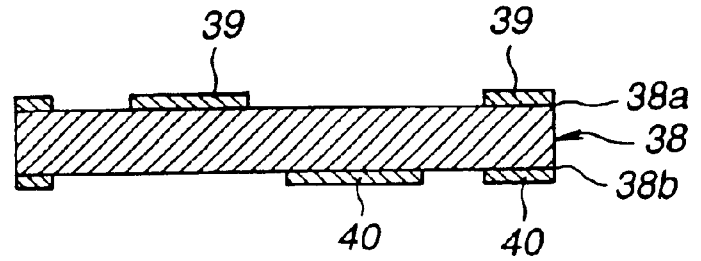
Figure 7B:
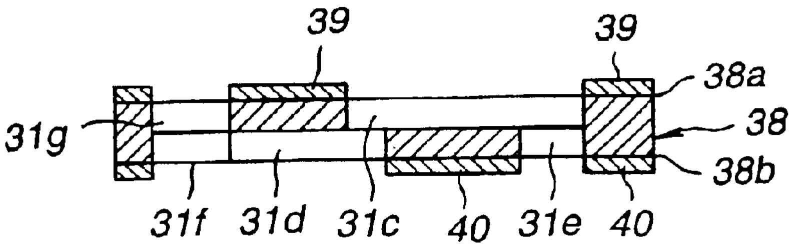
FIG. 7B is a longitudinal cross-sectional view showing the state in which etching has been effected using the resist as a mask.

Then, as shown in FIG. 7B, the metal member 38 is etched by immersion for a pre-set time in an etching solution composed of an aqueous solution of ferric chloride, using, as a mask, a resist 39 patterned in meeting with the ink pressurizing chamber 31*c* and the connection hole 31*g* and a resist 40 patterned in meeting with the ink inlet duct 31*e*, ink flow duct 31*d* and the ink buffer tank 31*f*, for forming the ink pressurizing chamber 31*c* and the connection hole 31*g* on the major surface 38*a* of the metal member 38, while forming the ink inlet duct 31*e*, ink flow duct 31*d* and the ink buffer tank 31*f* on the opposite side major surface of the metal member 38. This completes the above-mentioned ink pressurizing chamber forming member 31.

The amounts of etching from the major surface 38*a* and the opposite side major surface 38*b* of the metal member 38 are set so as to be slightly larger than approximately one-half the thickness of the metal member 38. Since the thickness of the metal member 38 in the present embodiment is set to approximately 0.1 mm, the etching amount from each side of the metal member 38 is set to approximately 0.055 mm. By setting the etching amount in this manner, the ink pressurizing chamber 31*c*, ink inlet duct 31*e*, ink flow duct 31*d* and the ink buffer tank 31*f* is improved in dimensional accuracy and may be formed in stability.

Moreover, the etching amount from the major surface 38*a* of the metal member 38 is the same as that of from the opposite side major surface 38*b*, the etching condition used at the time of forming the ink pressurizing chamber 31*c* and the connection hole 31*g* on the major surface 38*a* of the metal member 38 may be substantially equated to that used for forming the ink inlet duct 31*e*, ink flow duct 31*d* and the ink buffer tank 31*f* on the opposite side major surface 38*b* of the metal member 38, thus enabling the etching process to be completed easily in a shorter time.

It is noted that the width of the ink inlet duct 31*e* is set so as to be larger than the diameter than the diameter of the ink emission hole 33*a*, so that pressure rise in the ink pressurizing chamber 31*c* is not affected by pressure applied across the ink pressurizing chamber 31*c*. Moreover, the width of the ink inlet duct 31*e* is set so as to be approximately equal to the width at the forming position of the ink inlet duct 31*e* of the ink pressurizing chamber 31*c* but smaller than the main width of the ink pressurizing chamber 31*c*. The width of the ink inlet duct 31*e* is preferably not larger than 2.5 times the plate thickness. The width of the ink inlet duct 31*e* approximately equal to the plate thickness tends to produce shape errors during the fabrication process. In the present embodiment, the width of the ink inlet duct 31*e* is of the order of 0.2 mm which is approximately twice the plate thickness.

Figure 7C:
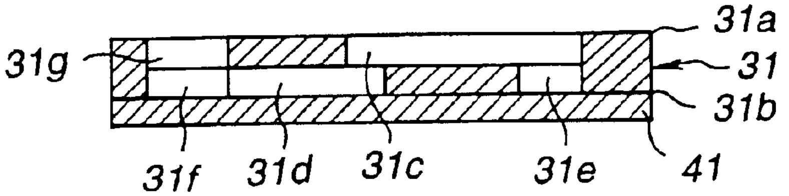
FIG. 7C is a longitudinal cross-sectional view showing the state in which a resin material has been bonded to the metal member freed of the resist.
Figure 7D:
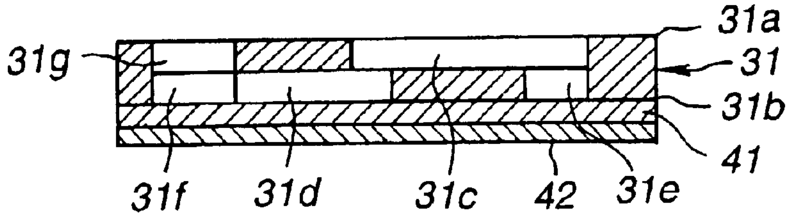
FIG. 7D is a longitudinal cross-sectional view showing the state in which a liquid-repellant film has been formed on the resin material and FIG. 7E is a longitudinal cross-sectional view showing the state in which ink emission holes have been formed in the resin material and in the liquid-repellant film.

Then, the resists 39, 40 are removed, as shown in FIG. 7C. If, in this case, dry resist films are used as the resists 39, 40, an aqueous solution of sodium hydroxide with a concentration of not higher than 5% of sodium hydroxide is used as a removing agent. If liquid resist films are used as the resists 39, 40, a dedicated alkaline solution is used as a remover. After removing the resists 39, 40, a resin material 41 of, for example Neoflex (manufactured by MITSUI TOATSU KAGAKU KOGYO KK) having a thickness of approximately 50 μm and a glass transition temperature of not higher than 250° C. is bonded by thermal pressure bonding to the opposite side major surface 31*b* of the ink pressurizing chamber forming member 31. This thermal pressure bonding is effected by applying a pressure of the order of 20 to 30 $kgf/cm^2$ at a press-working temperature of 230° C. By setting the condition for thermal pressure bonding in this manner, the bonding strength between the ink pressurizing chamber forming member 31 and the resin material 41 can be increased, while these can be bonded together efficiently.

Also, since the ink emission hole 33*a* is not formed in this case in the resin material 41, the bonding step in the process of bonding the resin material 41 to the ink pressurizing chamber forming member 31 can be performed easily to the extent that highly accurate position matching is not required. Moreover, since the resin material 41 is bonded to the ink pressurizing chamber forming member 31 without using an adhesive, there is raised no problem of the adhesive stopping up the ink flow duct 31*d*.

The liquid repellant film 42 is then formed on the surface of the resin material 41 facing the ink pressurizing chamber forming member 31. The liquid repellant film 42 is preferably formed of a material which repels the ink and which produces no ink remaining affixed in the vicinity of the ink emission hole while producing no burrs without causing ink film delamination in case the ink emission hole 33*a* is formed by excimer laser. Such material may be typified by the fluorine resin dispersed in a polyimide material (such as modified EEP material sold under the trade name of 958-207 by DUPONT; a polyimide based material having a hygroscopicity of 0.4% or less, such as polyimide based overcoat ink sold under the trade name of EPICOAT FS-100L and FP-100 by UBE KOSAN; and liquid-repellant polybenzoimidazole, such as coating type polybenzoimidazole material sold under the trade name of NPBI by HOECHIST AG.

Figure 7E:
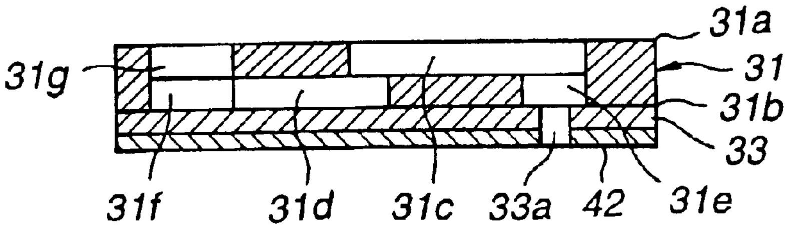

The resin material 41 is then irradiated perpendicularly with an excimer laser beam, from the side of the major surface 31*a* of the ink pressurizing chamber forming member 31, via the ink pressurizing chamber 31*c* and the ink inlet duct 31*e*, for forming the ink emission hole 33*a* in the resin material 41 and in the liquid repellant film 42, as shown in FIG. 7E. This gives the above-mentioned orifice plate 33. Since the orifice plate 33 is formed of the resin material 41, the ink emission hole 33*a* can be formed easily. The liquid repellant film 42 is formed of a material having excellent excimer laser working characteristics, the ink emission hole 33*a* can be formed easily. Moreover, since the ink inlet duct 31*e* is larger in diameter than the ink emission hole 33*a*, position matching between the resin material 41 and the ink pressurizing chamber forming member 31 during laser working need not be strict, while it becomes possible to evade the risk of the light beam being shielded during laser working by the ink pressurizing chamber forming member 31.

Figure 8A:
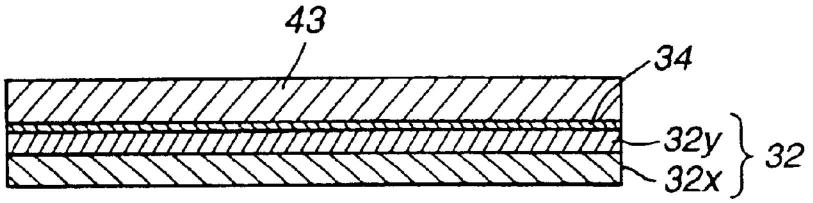

Then, a piezoelectric material 43 is bonded to the major surface of the second vibrating plate 32*y* of the double-layered vibrating plate 32 to a thickness of approximately 30 μm via an electrically conductive adhesive 34, as shown in FIG. 8A. In this case, a pressure of the order of 20 to 30 $kgf/cm^2$ is preferably used for bonding in order to reduce the thickness of the electrically conductive adhesive to as small a value as possible. This stabilizes the electrical resistance of the junction portion between the piezoelectric material 43 and the vibrating plate 32 while assuring stable adhesion in view of strength.

On both sides of the piezoelectric material 43 is formed an electrically conductive film of, for example copper-nickel alloys, approximately 0.2 μm thick, for assuring electrical connection, by a thin-film forming method, such as sputtering. As the electrically conductive adhesive 34, an epoxy-based adhesive cured at room temperature, admixed with electrically conductive materials, such as carbon particles, for example, is used.

Figure 8B:
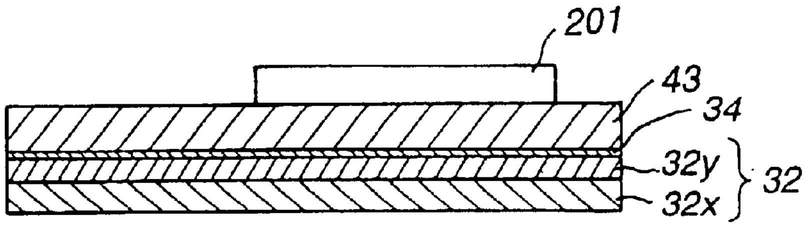

A resist material 201, shaped similarly to the ink pressurizing chamber 31*c*, is formed on the piezoelectric material 43, as shown in FIG. 8B. As this resist material 201, a resist for sandblasting, such as BF-405 or BF-403 (trade names) sold by TOKYO OKA or a powder beam etching resist may be used. By using these resist materials, the resolution of the order of 50 μm in terms of the minimum line width may be realized.

Figure 8C:
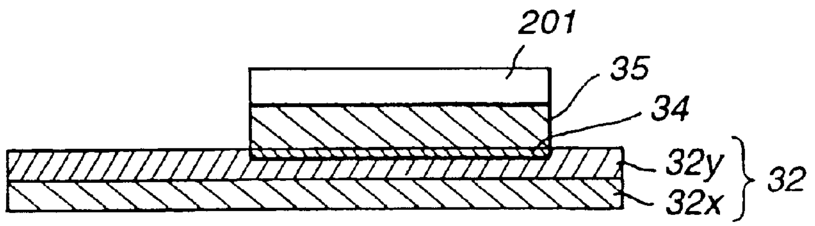

Then, using a sand-blasting device or a powder beam etching device, a solid-gaseous two-phase jet stream containing diamond particles 5 to 30 μm in size is sprayed onto the piezoelectric material 43 carrying the resist material 201 for processing the piezoelectric material 43 to a shape corresponding to that of the resist material 201 to produce a piezoelectric device 35, as shown in FIG. 8C. By using fine diamond particles of the order of 5 to 30 μm, a value of 8 to 9 can be realized as the value of processing speed ratio of the piezoelectric material 43 which later becomes the piezoelectric device 35 to the copper material making up the second vibrating plate 32*y*. That is, the processing speed for the piezoelectric material is 8 to 9 times faster than that for the copper material. The result is that, in the processing process of the piezoelectric device 35 shown in FIG. 8C, the processing area can be limited to the copper material making up the second vibrating plate 32*y*.

Figure 8D:
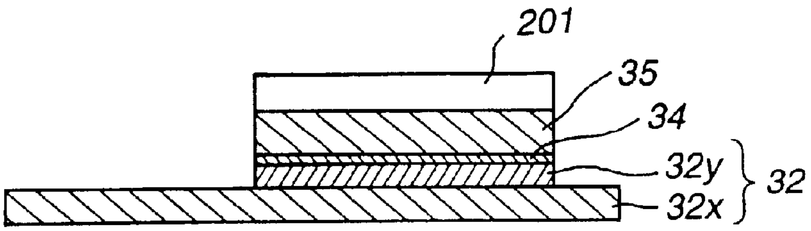

The vibrating plate 32, carrying the piezoelectric device 35, is immersed in a ferric chloride solution, or a shower of the ferric chloride solution is sprayed onto the vibrating plate 32 carrying the piezoelectric device 35, for removing the portion of the second vibrating plate 32*y* not carrying the piezoelectric device 35. Since the first vibrating plate 32*x* is formed of a polyimide or titanium material, and hence is not attacked during the removal process by the aqueous solution of ferric chloride as the etching solution for the second vibrating plate 32*y*, only the second vibrating plate 32*y* is removed, as shown in FIG. 8D.

Figure 8E:
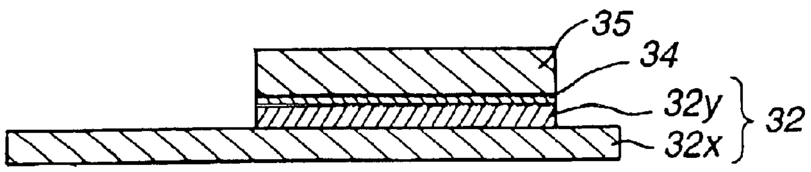

The resist material 201, left on the piezoelectric device 35, is then removed, using a dedicated removing solution, as shown in FIG. 8E.

Although the above explanation has been made of removing the second vibrating plate 32*y*, using, as a mask, the resist material 201 used for forming the piezoelectric device 35, it is also possible to remove the resist 201 before the step of removing the second vibrating plate 32*y*, as shown in FIG. 9A, and to remove the second vibrating plate subsequently, using the piezoelectric device 35 as a mask, as shown in FIG. 9B.

If the second vibrating plate 32*y* is removed using the resist material 201 as a mask, the electrode material formed on each side of the piezoelectric device 35 can be protected more reliably, whereas, if the second vibrating plate 32*y* is removed after removal of the resist material 201, using the piezoelectric device 35 as a mask, the etching can be improved in precision because the aqueous solution of ferric chloride as the etching solution for the second vibrating plate 32*y* can penetrate into the inside of a narrow groove more promptly.

Although the foregoing description has been made of using the double layer structure for the vibrating plate 32 comprised of the first and second vibrating plates 32*x* and 32*y* and removing the second vibrating plate 32*y*, at least one layer towards the piezoelectric device 35 is etched off if the vibrating plate 32 is the multi-layered structure composed of three or more layers.

Next, the ink pressurizing chamber forming member 31 carrying the orifice plate 33 is bonded to the vibrating plate 32 carrying the piezoelectric device 35, as shown in FIG. 10A. An epoxy-based adhesive may be used as an adhesive. If the polyimide material of Neoflex is used as the material for the first vibrating plate 32*x*, bonding may be achieved, without using the adhesive, by using a hot-press working process at a temperature of 220 to 230° C. under a pressure of 20 to 30 $kgf/cm^2$, by exploiting the adhesive properties of the polyimide material, thereby improving resistance against chemicals.

If a titanium material is used for the first vibrating plate 32*x*, which is used as an actuator for the printer, its resonance frequency can be raised for increasing the ink emission speed.

An ink supply duct 36 is then bonded to the site of the through-hole 32*b* of the vibrating plate 32, using, for example, an epoxy-based adhesive. This completes an ink jet printer head 15.

The above-described manufacture of the ink jet printer head 15 makes it possible to form the piezoelectric device 35 to an optional shape inclusive of a linear shape, in contradistinction from the conventional practice in which the shape of the piezoelectric device 35 is necessarily linear. The separation between neighboring piezoelectric devices 35 can be set easily to 100 μm or less. This renders it possible to reduce the nozzle pitch in the printer device.

Moreover, in the conventional manufacturing method, abrasion to the tool needs to be taken into account in designing. In the manufacturing method of the present embodiment, there is no necessity of taking the abrasion of the blade into account, thus realizing a designing which places more emphasis on the ink emission performance.

Also, in the manufacturing method of the printer device of the present embodiment, substantially the entire surface of the piezoelectric material 43 bonded to the vibrating plate 32 can be split simultaneously, thus significantly reducing the processing time.

Second Embodiment

In the present embodiment, the present invention is applied to a serial type 'carrier jet' printer.

A serial type 'carrier jet' printer 50 (abbreviated to printer device 50) includes a cylindrically-shaped drum 51, and a paper sheet pressing controller 52 provided at a pre-set position on the outer peripheral surface thereof parallel to the drum 51. With the present printer device 50, a printing paper sheet 53, as a printing support, is sandwiched between the drum 51 and the paper sheet pressing controller 52 for pressing the printing paper sheet 53 in position against the drum 51.

At a small separation from the outer periphery of the drum 51 of the printer device is mounted a feed screw 54 parallel to the drum 51. On this feed screw 54 is mounted a 'carrier jet' printer head 54 via a supporting member 55 meshing with the feed screw 54. By rotating the feed screw 54, this 'carrier jet' printer head 56 is adapted for being moved along with the supporting member 55 meshing with the feed screw 54 axially of the drum 51 as shown by arrow A in FIG. 11.

Figure 11:
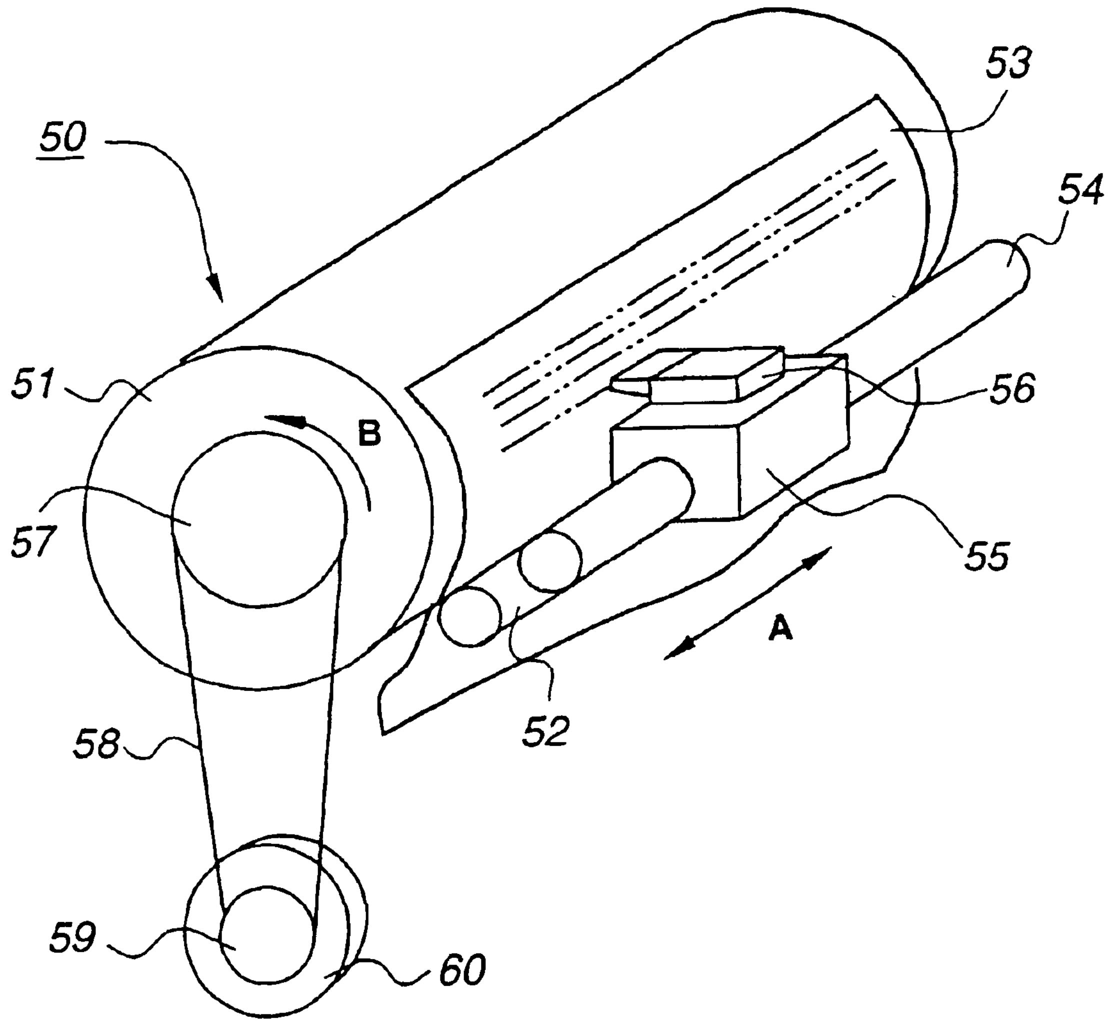
FIG. 11 is a perspective view showing essential portions of a serial type 'carrier jet' printer device according to a second embodiment of the present invention.

The drum 51 is coordinated to a motor 60 via a first pulley 57, a belt 58 and a second pulley 59, and hence is rotated in a direction indicated by arrow B in FIG. 11 with rotation of the motor 60.

Figure 12:
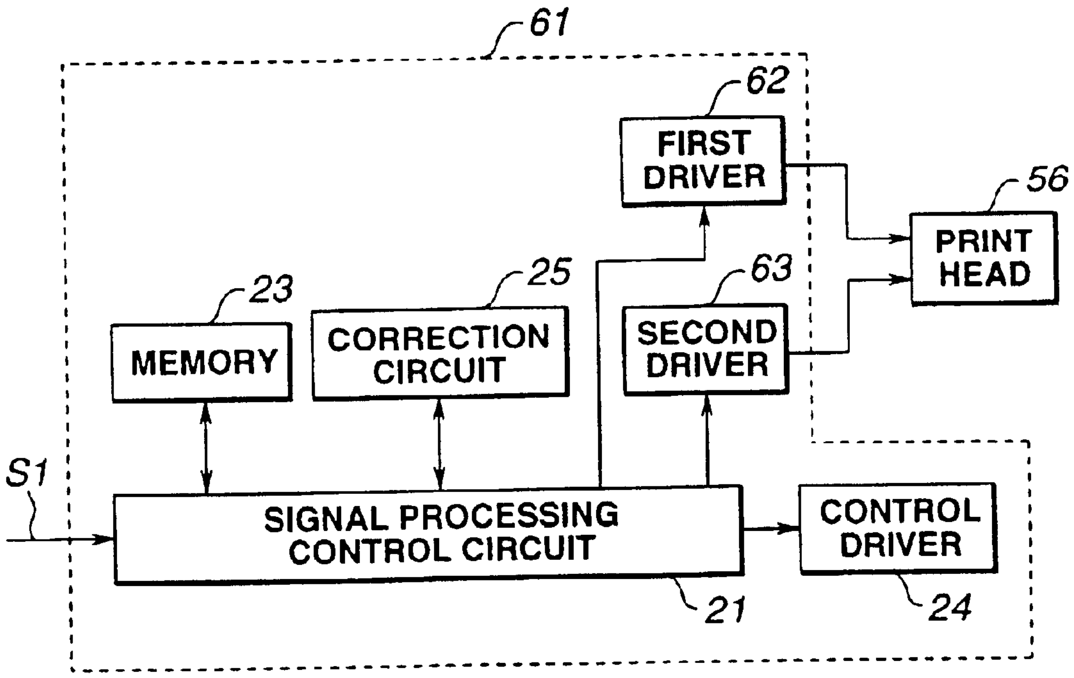
FIG. 12 illustrates the structure of a controller of the printer device.

The printer device 50 is controlled by a controller 61, as shown in FIG. 12. In the controller, the signal processing control circuit 21, memory 23, driving controller 24 and the correction circuit 25 are the same as the signal processing control circuit 21, memory 23, driving controller 24 and the correction circuit 25 and hence are not explained in detail.

The controller 61 of the printer device 50 of the present embodiment includes a first driver 62 for emitting the ink and a second driver 63 for emitting the dilution liquid. In actuality, plural first drivers 62 corresponding to the number of the ink emission holes and plural second drivers 63 corresponding to the number of the dilution liquid emission holes are provided, respectively. The first driver 62 and the second driver 63 are used for driving controlling the first piezoelectric device (quantitation side) provided for emitting the ink via the ink emission holes and for driving controlling the second piezoelectric device (emission side) provided for emitting the dilution liquid via the dilution liquid emission holes, respectively.

Figure 13:
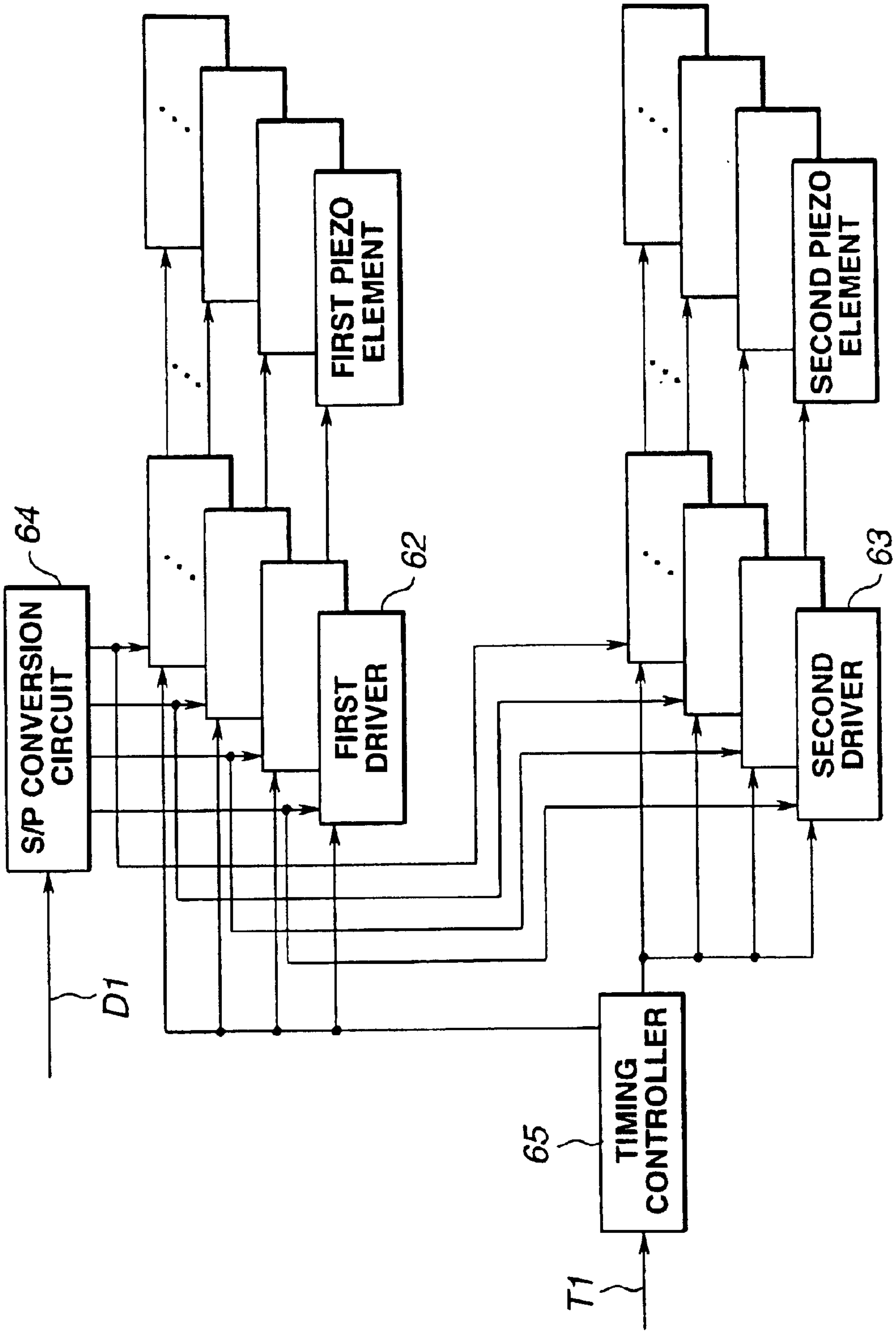
FIG. 13 illustrates the operation of the controller.

The first and second drivers 62, 63 driving-control the associated first and second piezoelectric devices, respectively, under control by a serial/parallel conversion circuit 64 and a timing control circuit 65, provided in the signal processing control circuit 21, as shown in FIG. 13.

Specifically, the serial/parallel conversion circuit 64 sends digital half-tone data D1 to the first driver 62 and to the second driver 63.

On reception of a letter-printing trigger signal T1, the timing control circuit 65 sends out timing signals to the first and second drivers 62, 63 at pre-set timing. This letter-printing trigger signal T1 is sent at a letter printing timing to the timing control circuit 65.

Figure 14:
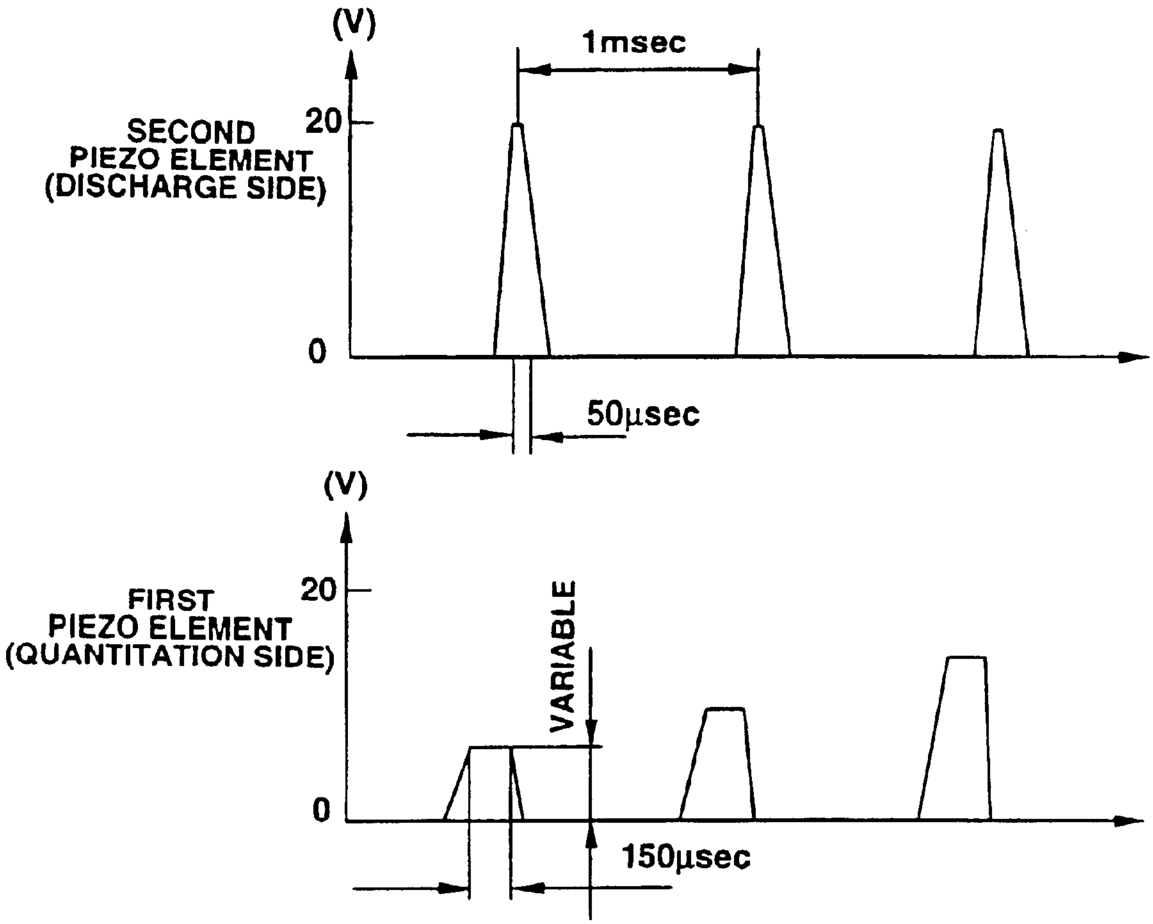
FIG. 14 illustrates the timing of the driving voltages applied across the first and second piezoelectric devices.

The first and second drivers 62, 63 send to associated first and second piezoelectric devices driving signals (driving voltage signals) corresponding to the timing signals from the timing control circuit 65. The timing control circuit 65 sends the timing signals to the first and second drivers 62, 63 so that the driving voltage signals applied to the first and second piezoelectric devices will be of the timing as shown for example in FIG. 14. It is noted that the first and second piezoelectric devices are associated with paired ink emission holes and dilution liquid emission holes, respectively.

In the present embodiment, the emission period is 1 msec (frequency of 1 kHz). The ink quantitation and mixing and emission of liquid droplets take place during this time period. There takes place no ink quantisation and mixing if the digital half-tone data D1 from the serial/parallel conversion circuit 64 is lower than a pre-set threshold value.

The 'carrier jet' printer head 56 is hereinafter explained.

Figure 15:
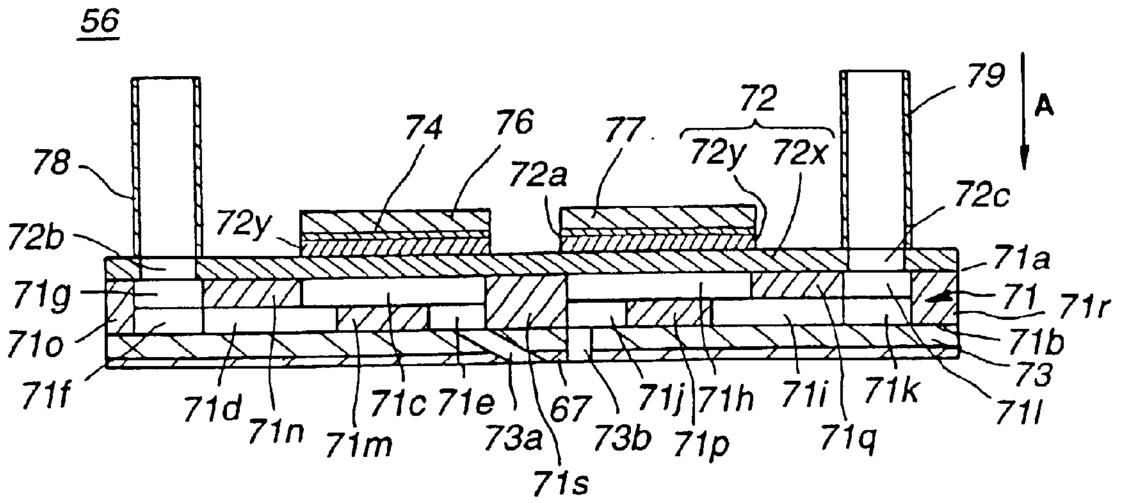
FIG. 15 is a longitudinal cross-sectional view of the 'carrier jet' printer head of the printer device.

Referring to FIG. 15, the 'carrier jet' printer head 56 includes a plate-shaped pressurizing chamber forming member 71 on one major surface 71*a* and on the opposite side major surface 71*b* of which a vibrating plate 72 and a plate-shaped orifice plate 73 are bonded, respectively. In the 'carrier jet' printer head 56, a first piezoelectric device 76 (corresponding to the above-mentioned first piezoelectric device) and a second piezoelectric device 77 (corresponding to the above-mentioned second piezoelectric device) are bonded to one 72*a* of the major surfaces of the vibrating plate 72. There is formed a liquid repellant film 67 around the portions of the orifice plate 73 in which are opened an ink emission hole 73*a* and a dilution liquid emission hole 73*b* as later explained.

The pressurizing chamber forming member 71 is formed by a metal plate of stainless steel with a thickness of approximately 0.1 mm. The pressurizing chamber forming member 71 is formed with an ink pressurizing chamber 71*c* for pressurizing the ink charged therein to a pre-set pressure, and an ink flow duct 71*d* communicating with one end of the ink pressurizing chamber 71*c* and adapted for serving as a conduit for supplying the ink to the ink pressurizing chamber 71*c*. The pressurizing chamber forming member 71 is also formed with an ink inlet hole 71*e* at the opposite end of the ink pressurizing chamber 71*c* and adapted for serving as a through-hole for conducting the ink charged into the ink pressurizing chamber 71*c* to the ink emission hole 73*a*. The pressurizing chamber forming member 71 is also formed with an ink buffer tank 71*f* for supplying the ink to the ink flow duct 71*d*, and a first connection hole 71*g* for sending the ink supplied from an ink supply duct 78 into the ink buffer tank 71*f*. The pressurizing chamber forming member 71 is also formed with a dilution liquid pressurizing chamber 71*h* for pressurizing the dilution liquid charged therein to a pre-set pressure, and a dilution liquid flow duct 71*i* communicating with one end of the dilution liquid pressurizing chamber 71*h* and adapted for serving as a conduit for supplying the dilution liquid to the dilution liquid pressurizing chamber 71*h*. The pressurizing chamber forming member 71 is also formed with a dilution liquid inlet hole 71*j* at the opposite end of the dilution liquid pressurizing chamber 71*h* and adapted for serving as a through-hole for conducting the dilution liquid charged into the dilution liquid pressurizing chamber 71*h* to the dilution liquid emission hole 73*b*. The pressurizing chamber forming member 71 is also formed with a dilution liquid buffer tank 71*k* for supplying the dilution liquid to the dilution liquid flow duct 71*i*, and a first connection hole 71*l* for sending the dilution liquid supplied from an dilution liquid supply duct 79 into the dilution liquid buffer tank 71*k*.

The ink pressurizing chamber 71*c* is formed for extending from a mid portion along the thickness of the pressurizing chamber forming member 71 to the major surface 71*a* of the pressurizing chamber forming member 71. The ink inlet duct 71*e* is formed at the opposite end of the ink pressurizing chamber 71*c* for extending from a mid portion along the thickness of the pressurizing chamber forming member 71 to the opposite major surface 71*b* of the pressurizing chamber forming member 71.

Similarly to the ink inlet hole 71*e*, the ink flow duct 71*d* is formed for extending from a mid portion along the thickness of the pressurizing chamber forming member 71 to the opposite major surface 71*b* of the pressurizing chamber forming member 71. The ink flow duct 71*d* is separated by a first member 71*m* from the ink inlet hole 71*e*. The ink flow duct 71*d* is formed so that a portion thereof on the side of the first member 71*m* communicates with an end of the ink pressurizing chamber 71*c*.

Figure 16:
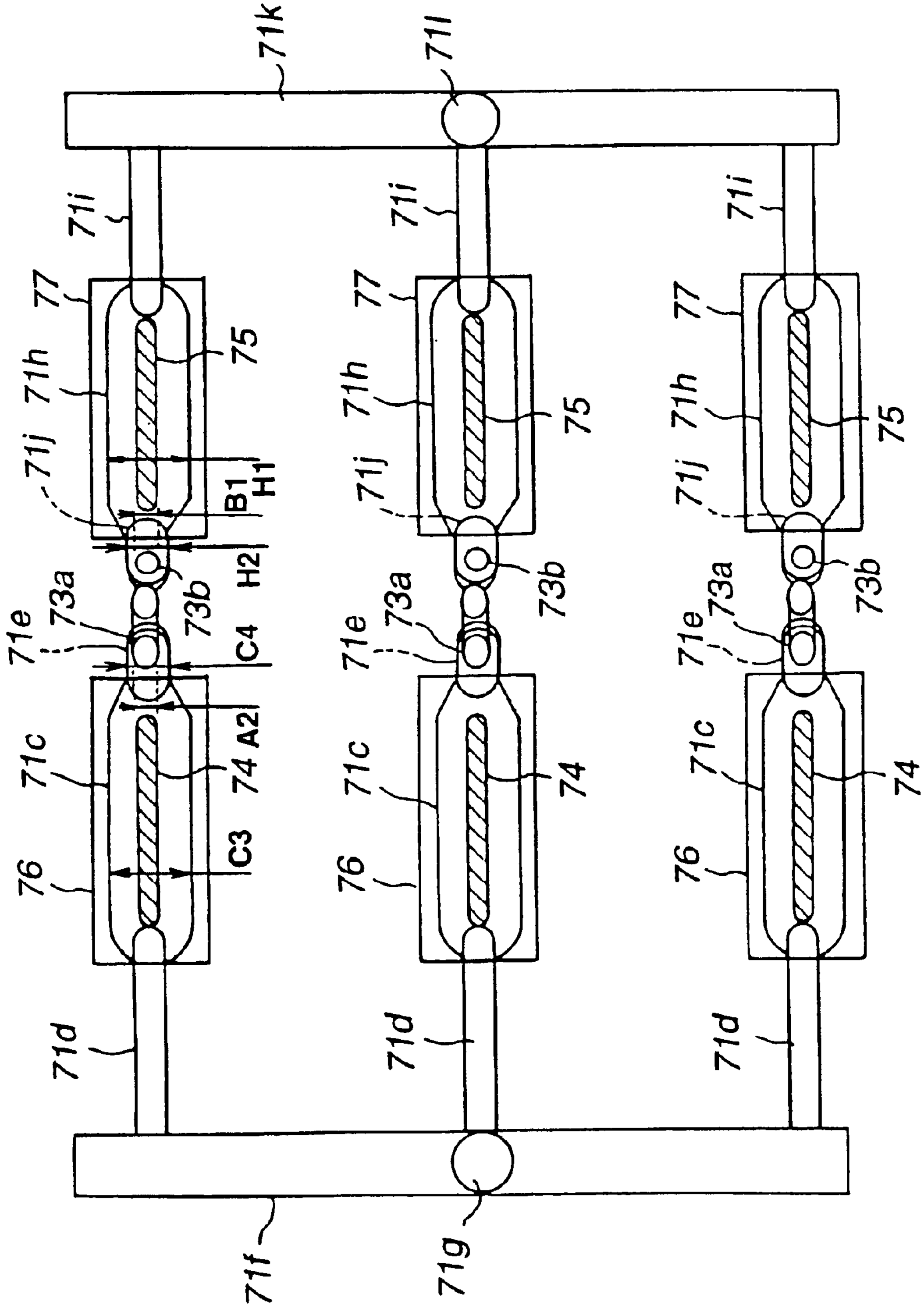
FIG. 16 is a schematic plan view of the 'carrier jet' printer head of the printer device.

Similarly to the ink inlet hole 71*e* and the ink flow duct 71*d*, the ink buffer tank 71*f* is formed for extending from a mid portion along the thickness of the pressurizing chamber forming member 71 to the opposite major surface 71*b* of the pressurizing chamber forming member 71. The ink buffer tank 71*f* is a linear sole piping communicating with plural ink flow ducts 71*d* and has the function of supplying the ink to the ink flow ducts 71*d*, as shown in FIG. 16.

The first connection hole 71*g* is formed for extending from a mid portion along the thickness of the pressurizing chamber forming member 71 to the major surface 71*a* thereof for communicating with the ink buffer tank 71*f*.

The pressurizing chamber forming member 71 includes a first member 71*m*, a second member 71*n* and a third member 71*o*. The first member 71*m* forms the bottom surface of the ink pressurizing chamber 71*c* and a portion of the opposite side major surface 71*b* of the pressurizing chamber forming member 71 and is contacted with a lateral surface of the ink inlet hole 71*e* and a lateral surface of the ink flow duct 71*d* for separating the ink inlet hole 71*e* from the ink flow duct 71*d*. The second member 71*n* forms the top surface of the ink flow duct 71*d* and a portion of the major surface 71*a* of the pressurizing chamber forming member 71 and is contacted with a lateral surface of the ink pressurizing chamber 71*c* and a lateral surface of the first connection hole 71*g* for separating the ink pressurizing chamber 71*c* from the first connection hole 71*g*. The third member 71*o* is contacted with the lateral surface of the ink buffer tank 71*f* and the opposite lateral surface of the first connection hole 71*g* and constitutes the major surface 71*a* and a portion of the opposite side major surface 71*b* of the pressurizing chamber forming member 71. The voids delimited by the first to third members 71*m*, 71*n* and 71*o* and a seventh member 71*s* as later explained correspond to the ink pressurizing chamber 71*c*, ink inlet hole 71*e*, ink flow duct 71*d*, ink buffer tank 71*f* and the first connection hole 71*g*, respectively.

The dilution liquid pressurizing chamber 71*h* is formed for extending from a mid portion along the thickness of the pressurizing chamber forming member 71 towards the major surface 71*a* thereof. The dilution liquid flow duct 71*j* is formed at the opposite end of the dilution liquid pressurizing chamber 71*h* and is formed for extending from a mid portion along the thickness of the pressurizing chamber forming member 71 towards the opposite side major surface 71*b* thereof.

Similarly to the dilution liquid inlet duct 71*j*, the dilution liquid flow duct 71*i* is formed for extending from a mid portion along the thickness of the pressurizing chamber forming member 71 towards the opposite side major surface 71*b* thereof. The dilution liquid flow duct 71*i* is separated from the dilution liquid inlet duct 71*j* by a fourth member 71*p* which will be explained subsequently. The dilution liquid flow duct 71*i* is formed so that part thereof towards the fourth member 71*p* communicates with one end of the dilution liquid pressurizing chamber 71*h*.

Similarly to the dilution liquid inlet duct 71*j* and the dilution liquid flow duct 71*i*, a dilution liquid buffer tank 71*k* is formed for extending from a mid portion along the thickness of the pressurizing chamber forming member 71 towards the opposite side major surface 71*b* thereof. Similarly to the ink buffer tank 71*f*, the dilution liquid buffer tank 71*k* is a sole linear piping communicating with plural dilution liquid flow ducts 71*i*, as shown in FIG. 16, and performs the function of supplying the ink to the dilution liquid flow ducts 71*i*.

A second connection hole 71*l* is formed for extending from a mid portion along the thickness of the pressurizing chamber forming member 71 towards the major surface 71*a* of the pressurizing chamber forming member 71.

The pressurizing chamber forming member 71 is formed with a fourth member 71*p*, a fifth member 71*q* and a sixth member 71*r*. The fourth member 71*p* forms the bottom surface of the dilution liquid pressurizing chamber 71*h* and a portion of the opposite side major surface 71*b* of the pressurizing chamber forming member 71 and is contacted with a lateral surface of the dilution liquid inlet hole 71*j* and a lateral surface of the dilution liquid flow duct 71*i* for separating the dilution liquid inlet hole 71*j* from the dilution liquid flow duct 71*i*. The fifth member 71*q* forms the top surface of the dilution liquid flow duct 71*i* and a portion of the major surface 71*a* of the pressurizing chamber forming member 71 and is contacted with a lateral surface of the dilution liquid pressurizing chamber 71*h* and a lateral surface of the second connection hole 71*l* for separating the dilution liquid pressurizing chamber 71*h* from the second connection hole 71*g*. The third member 71*r* is contacted with the lateral surface of the dilution liquid buffer tank 71*k* and with the opposite lateral surface of the second connection hole 71*l* and constitutes the major surface 71*a* and a portion of the opposite side major surface 71*b* of the pressurizing chamber forming member 71.

The pressurizing chamber forming member 71 is also formed with a seventh member 71*s* surrounded by the opposite lateral surface of the ink pressurizing chamber 71*c*, opposite lateral surface of the ink inlet hole 71*e*, opposite lateral surface of the dilution liquid pressurizing chamber 71*h* and by the opposite lateral surface of the dilution liquid inlet duct 71*j* for forming one major surface 71*a* and a portion of the opposite side major surface 71*b* of the pressurizing chamber forming member 71.

The voids delimited by the fourth to seventh members 71*p*, 71*q*, 71*r* and 71*s* correspond to the dilution liquid pressurizing chamber 71*h*, dilution liquid inlet hole 71*i*, dilution liquid flow duct 71*j*, dilution liquid buffer tank 71*k* and the first connection hole 71*l*, respectively.

On the opposite side major surface 71*b* of the pressurizing chamber forming member 71 is bonded, by thermal pressure bonding, the ink inlet hole 71*e*, ink flow duct 71*d*, ink buffer tank 71*f*, dilution liquid inlet duct 71*j*, dilution liquid flow duct 71*i* and the dilution liquid buffer tank 71*k*. This orifice plate 73 is formed of, for example, Neoflex (manufactured by MITSUI TOATSU KAGAKU KOGYO KK) having a thickness of approximately 50 μm and a glass transition temperature of not higher than 250° C.

In this orifice plate 73 is obliquely formed the ink emission hole 73*a* of a pre-set diameter so as to be directed to a dilution liquid emission hole 73*b* as later explained. The ink emission hole 73*a* communicates with the ink inlet hole 71*e* and is adapted for emitting the ink supplied from the ink pressurizing chamber 71*c* via the ink inlet hole 71*e*. In the orifice plate 73 is also formed a dilution liquid emission hole 73*b* of a columnar cross-section of a pre-set diameter. The dilution liquid emission hole 73*b* communicates with the dilution liquid inlet duct 71*j* and is adapted for emitting the dilution liquid supplied from the dilution liquid pressurizing chamber 71*h* via the dilution liquid inlet duct 71*j*. By having the orifice plate 73 formed with the ink emission hole 73*a* and with the dilution liquid emission hole 73*b* in this manner, chemical stability can be assured for the ink and the dilution liquid.

The above-mentioned first and second piezoelectric devices 76, 77 are shaped similarly to the ink pressurizing chamber 71*c* and the dilution liquid pressurizing chamber 71*h*, as shown in FIG. 16. The separation between the neighboring first and second piezoelectric devices 76, 77 is set to not larger than 100 μm.

The ink pressurizing chamber 71*c* is designed so that the width C4 at the site of the ink inlet hole 71*e* is smaller than the main width C3 of the ink pressurizing chamber 71*c* and larger than the opening diameter A2 towards the ink inlet hole 71*e* of the ink emission hole 73*a*. Specifically, with the main width C3 of the ink pressurizing chamber 71*c* of 0.4 to 0.6 mm, the width C4 at the site of the ink inlet hole 71*e* of the ink pressurizing chamber 71*c* is of the order of 0.2 mm which is approximately twice the plate thickness of the pressurizing chamber forming member 71.

On the other hand, the width H2 at the site of the dilution liquid inlet duct 71*j* of the dilution liquid pressurizing chamber 71*h* is set so as to be smaller than the main width H1 of the dilution liquid pressurizing chamber 71 and larger than the opening diameter B1 towards the dilution liquid inlet duct 71*j* of the dilution liquid emission hole 73*b*. Specifically, with the main width H1 of the dilution liquid pressurizing chamber 71*h* of 0.4 to 0.6 mm, the width H2 at the site of the dilution liquid inlet hole 71*j* of the dilution liquid pressurizing chamber 71*h* is of the order of 0.2 mm which is approximately twice the plate thickness of the pressurizing chamber forming member 71.

The width C4 at the site of the ink inlet hole 71*e* of the ink pressurizing chamber 71*c* and the width H2 at the site of the dilution liquid inlet hole 71*j* of the dilution liquid pressurizing chamber 71*h* are preferably set so as to be not larger than 2.5 times the thickness of the pressurizing chamber forming member 71.

In the present embodiment, the dilution liquid emission hole 73*b* is formed such as to communicate with the mid portion of the dilution liquid inlet duct 71*j*. Similarly to the ink emission hole 33*a* of the first embodiment, the dilution liquid emission hole 73*b* is tapered along the direction of emission of the dilution liquid. The cross-sectional shape at an opening area of the dilution liquid emission hole 73*b* is circular with a diameter of approximately 35 μm, while its cross-sectional shape towards the pressurizing chamber forming member 71 is circular with a diameter of approximately 80 μm. Thus, the width H2 at the site of the dilution liquid inlet hole 71*j* of the dilution liquid pressurizing chamber 71*h* is smaller than the main width H1 of the dilution liquid pressurizing chamber 71*h* but larger than the opening diameter B1 of the dilution liquid emission hole 73*b* towards the dilution liquid inlet duct 71*j*.

Moreover, since the ink emission hole 73*a* is formed obliquely, it is of an elliptical cross-section. In the present embodiment, the cross-sectional shape of the ink emission hole 73*a* towards the pressurizing chamber forming member 71 is of a diameter along the short axis of approximately 80 μm. Therefore, the width C4 at the site of the ink inlet hole 71*e* of the ink pressurizing chamber 71*c* is smaller than the main width C3 of the ink pressurizing chamber 71*c* but larger than the opening diameter A2 towards the ink inlet hole 71*e* of the ink emission hole 73*a*.

On the major surface 71*a* of the pressurizing chamber forming member 71 is bonded, by an adhesive, a double-layered vibrating plate 72 for closing the ink pressurizing chamber 71*c* and the opening of the dilution liquid pressurizing chamber 71*h*. The opening of the ink pressurizing chamber 71*c* and that of the dilution liquid pressurizing chamber 71*h* mean the opening portions of the ink pressurizing chamber 71*c* and the dilution liquid pressurizing chamber 71*h* in the major surface 71*a* of the pressurizing chamber forming member 71.

The vibrating plate 72 is of a double-layered structure formed by a first vibrating plate 72*x* and a second vibrating plate 72*y*. The first vibrating plate 72*x* is positioned towards the ink pressurizing chamber 71*c* and a dilution liquid pressurizing chamber 71*h* and is adapted for closing all openings of the ink pressurizing chamber 71*c* and the dilution liquid pressurizing chamber 71*h*, whilst the second vibrating plate 72*y* is shaped similarly to a piezoelectric device 75 formed on the vibrating plate 72.

In this vibrating plate 72 are formed a first through-hole 72*b* and a second through-hole 72*c* in register with the first connection hole 71*g* and a second connection hole 71*l*, respectively. In these first and second through-holes 72*b*, 72*c* are mounted an ink supply duct 78 and a dilution liquid supply duct 79, respectively, connected to an ink tank and a dilution liquid tank, not shown, respectively. Thus, the ink supplied from the ink tank is supplied via ink supply duct 78 and ink buffer tank 71*f* to an ink flow duct 71*d* and thence to the ink pressurizing chamber 71*c*. The dilution liquid supplied form the dilution liquid tank is supplied via a dilution liquid supply duct 79 and a dilution liquid buffer tank 71*k* to a dilution liquid flow duct 71*i* so as to be charged into the dilution liquid pressurizing chamber 71*h*.

For the first vibrating plate 72*x* of the double-layered vibrating plate 72, Neoflex (manufactured by MITSUI TOATSU KAGAKU KOGYO KK) having a thickness of approximately 50 μm and a glass transition temperature of not higher than 250° C. is used, as in the case of the orifice plate 73. As the first vibrating plate 72*x* of the double-layered vibrating plate 72, a copper plate approximately 15 μm thick, for example, is used.

On the major surface of the second vibrating plate 72*y* are bonded a first piezoelectric device 76 and a second piezoelectric device 77 via an electrically conductive adhesive 74.

Although the vibrating plate 72 of the present embodiment is a double-layered structure comprised of the first and second vibrating plates 72*x*, 72*y*, the vibrating plate 72 may also be formed as a sole-layer structure or a multi-layered structure of three or more layers.

Figure 17A:
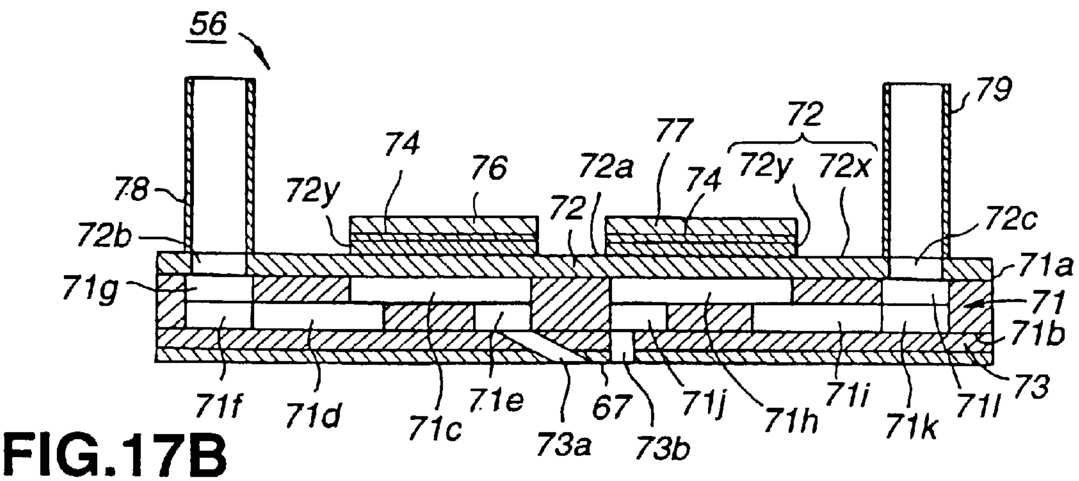
Figure 17B:
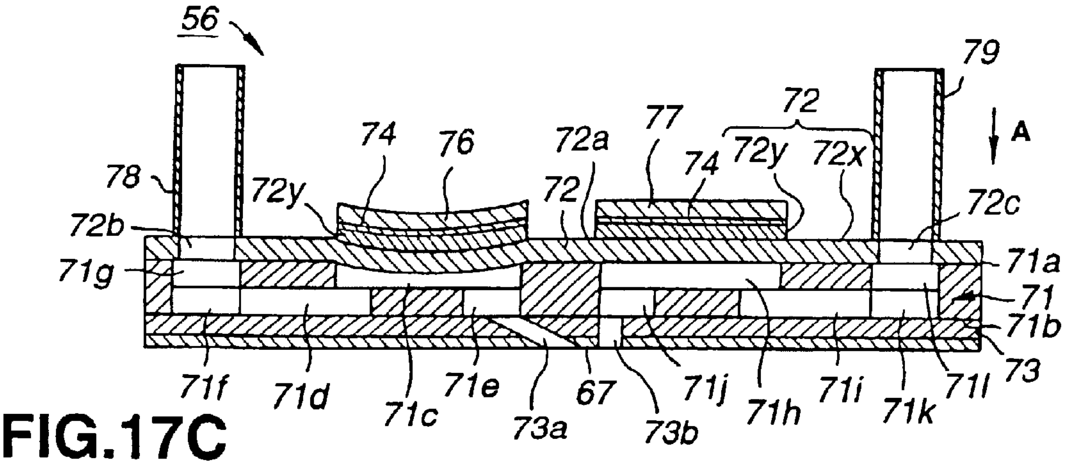

If a driving voltage is applied across the first piezoelectric device 76 in a state shown in FIG. 17A, the first piezoelectric device 76 is displaced in a direction indicated by arrow A in FIG. 17B for warping the vibrating plate 72 to decrease the volume of the ink pressurizing chamber 71*c* to raise the pressure therein.

Figure 17C:
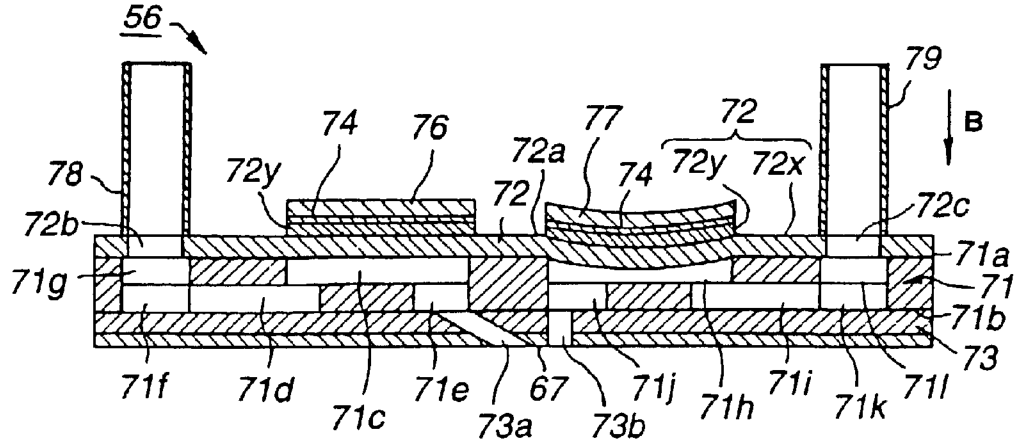

If a driving voltage is applied across the second piezoelectric device 77 in a state shown in FIG. 17B, the second piezoelectric device 77 is displaced in a direction indicated by arrow B in FIG. 17C for warping the vibrating plate 72 to decrease the volume of the dilution liquid pressurizing chamber 71*h* to raise the pressure therein.

The operation of the 'carrier jet' printer head 56 is now explained.

In the stand-by state, the ink and the dilution liquid, charged into the ink pressurizing chamber 71*c* and in the dilution liquid pressurizing chamber 71*h*, respectively, produce meniscuses in a stabilized state in the vicinity of the ink emission hole 73*a* and the dilution liquid emission hole 73*b*, by equilibrium with surface tension, as shown in FIG. 17A.

During ink quantitation, a driving voltage is applied across the first piezoelectric device 76 for displacing the first piezoelectric device in a direction indicated by arrow A in FIG. 17B. With this displacement of the first piezoelectric device 76, the vibrating plate 72 is displaced in a direction indicated by arrow A in FIG. 17B. By this displacement of the vibrating plate 72, the ink pressurizing chamber 71*c* is decreased in pressure so that the pressure therein is increased.

Since time changes of the driving voltage applied across the first piezoelectric device 76 are moderately set to prevent the ink from flying from the ink emission hole 73*a*, the ink is simply extruded without flying from the ink emission hole 73*a*. Since the driving voltage applied across the first piezoelectric device 76 is set to a value in meeting with the gradation of the picture data, the amount of the ink emitted from the distal end of the ink emission hole 73*a* corresponds to picture data. The ink extruded from the ink emission hole 73*a* is contacted and mixed with the dilution liquid forming the meniscus in the vicinity of the distal end of the dilution liquid emission hole 73*b*.

During ink emission, a driving voltage is applied across the second piezoelectric device 77 for displacing the first piezoelectric device in a direction indicated by arrow B in FIG. 17C. With this displacement of the first piezoelectric device 76, the vibrating plate 72 is displaced in a direction indicated by arrow B in FIG. 17C. By this displacement of the vibrating plate 72, the dilution liquid pressurizing chamber 71*h* is decreased in pressure so that the pressure therein is increased. This emits the mixed solution having an ink concentration in meeting with the picture data from the dilution liquid emission hole 73*b*. It is noted that time changes of the driving voltage applied across the second piezoelectric device 77 are set to permit the mixed solution to be emitted via the dilution liquid emission hole 73*b*.

Referring to FIGS. 18 to 21, the manufacturing method for the 'carrier jet' printer head 56 is hereinafter explained.

Figure 18A:
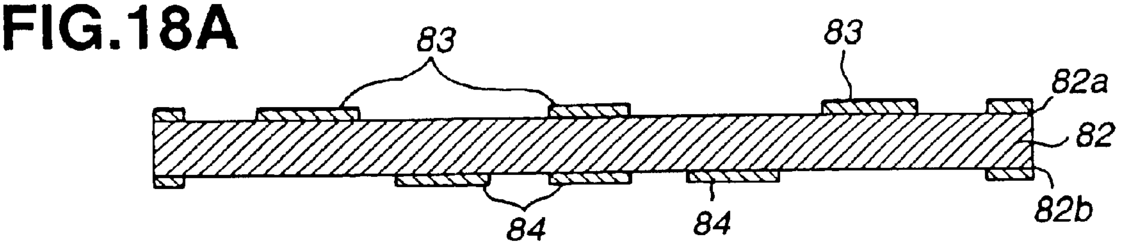

Referring first to FIG. 18A, a resist 83 of, for example, a photosensitive dry film or a liquid resist, is coated on one of the major surfaces 82*a* of a metal member 82 of, for example, stainless steel, approximately 0.1 mm thick. Then, pattern light exposure is carried out using a mask having a pattern corresponding to the ink pressurizing chamber 71*c*, first connection hole 71*g*, dilution liquid pressurizing chamber 71*h* and to the second connection hole 71*l*, at the same time as a resist 84 such as a photosensitive dry film or a liquid resist material, is coated on the opposite side major surface 82*b* of the metal member 82. Then, pattern light exposure is carried out using a mask having a pattern corresponding to the ink inlet hole 71*e*, ink buffer tank 71*f*, dilution liquid inlet duct 71*j*, dilution liquid flow duct 71*i* and the dilution liquid buffer tank 71*k*.

Figure 18B:
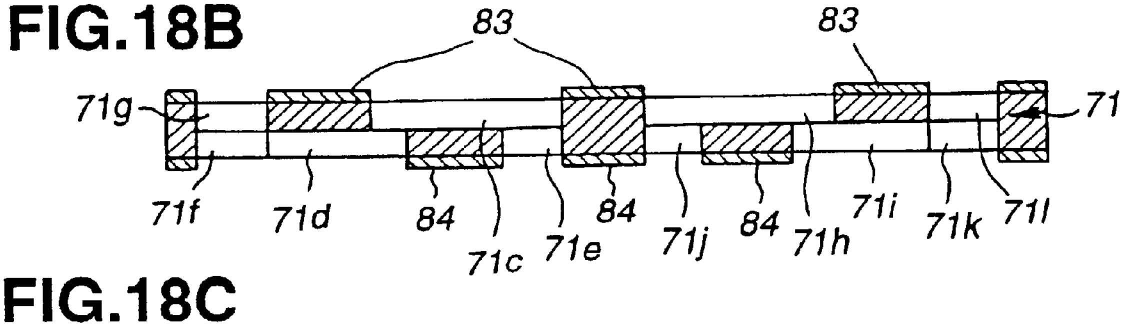

Then, as shown in FIG. 18B, the metal member 82 is etched by dipping for a pre-set time in an etching solution composed of, for example, an aqueous solution of ferric chloride, using, as masks, a resist 83 patterned in meeting with the ink pressurizing chamber 71*c*, first connection hole 71*g*, dilution liquid pressurizing chamber 71*h* and the second connection hole 71*l*, and a resist 84 patterned in meeting with the ink inlet hole 71*e*, ink flow duct 71*d*, ink buffer tank 71*f*, dilution liquid inlet duct 71*j*, dilution liquid flow duct 71*i* and to the dilution liquid buffer tank 71*k*, for forming the ink pressurizing chamber 71*c*, first connection hole 71*g*, dilution liquid pressurizing chamber 71*h* and the second connection hole 71*l* on the major surface 82*a* of the metal member 82. On the opposite side major surface 82 are formed the ink inlet hole 71*e*, ink flow duct 71*d*, ink buffer tank 71*f*, dilution liquid inlet duct 71*j*, dilution liquid flow duct 71*i* and the dilution liquid buffer tank 71*k*. This completes the above-mentioned pressurizing chamber forming member 71.

The amounts of etching from the major surface 82*a* and the opposite side major surface 82*b* of the metal member 82 are both set so as to be slightly larger than approximately one-half the thickness of the metal member 82. Since the thickness of the metal member 82 is set in the present embodiment to 0.1 mm, the etching amount from a side of the metal member 82 is set to approximately 0.0055 mm. By setting the etching amount to this value, the ink pressurizing chamber 71*c*, first connection hole 71*g*, ink inlet hole 71*e*, ink flow duct 71*d*, ink buffer tank 71*f*, dilution liquid pressurizing chamber 71*h*, second connection hole 71*l*, dilution liquid inlet duct 71*j*, dilution liquid flow duct 71*i* and the dilution liquid buffer tank 71*k* can e improved in dimensional accuracy and can be manufactured in stability.

Moreover, the etching amount from the major surface 82*a* of the metal member 82 is the same as that from the opposite side major surface 82*b*, the etching condition used for forming the ink pressurizing chamber 71*c*, the connection hole 71*g*, dilution liquid pressurizing chamber 71*h* and the second connection hole 71*l* on the major surface 82*a* of the metal member 82 may be substantially equated to that used for forming the ink inlet duct 71*e*, ink flow duct 71*d*, ink buffer tank 71*f*, dilution liquid inlet duct 71*j*, dilution liquid flow duct 71*i* and the dilution liquid buffer tank 71*k* on the opposite side major surface 82*b* of the metal member 82, thus enabling the etching process to be completed easily in a shorter time.

It is noted that the widths of the ink inlet duct 71*e* and the dilution liquid inlet duct 71*j* are set so as to be larger than the diameter of the ink emission hole 73*a* and the dilution liquid emission hole 73*b* so that pressure rise in the ink pressurizing chamber 71*c* and in the dilution liquid pressurizing chamber 71*h* is not affected by pressure applied across the ink pressurizing chamber 71*c* and the dilution liquid pressurizing chamber 71*h*.

Moreover, the width of the ink inlet duct 71*e* is set so as to be approximately equal to the width at the forming position of the ink inlet duct 71*e* of the ink pressurizing chamber 71$c$ but smaller than the main width of the ink pressurizing chamber 71$c$, while the width of the dilution liquid inlet duct 71$j$ is set so as to be approximately equal to the width at the forming position of the dilution liquid inlet duct 71$j$ of the dilution liquid pressurizing chamber 71$h$ but smaller than the main width of the dilution liquid pressurizing chamber 71$h$. The widths of the ink inlet duct 71$e$ and the dilution liquid inlet duct 71$j$ are preferably not larger than 2.5 times the plate thickness.

If the widths of the ink inlet hole 71$e$ and the dilution liquid inlet duct 71$j$ are of the same order as the plate thickness, shape errors tend to be produced during manufacturing processes. Therefore, the widths are preferably not less than the plate thickness from the viewpoint of the manufacturing processes. In the present embodiment, the widths of the ink inlet hole 71$e$ and the dilution liquid inlet duct 71$j$ are of the order of 0.2 mm which is approximately twice the plate thickness.

Figure 18C:
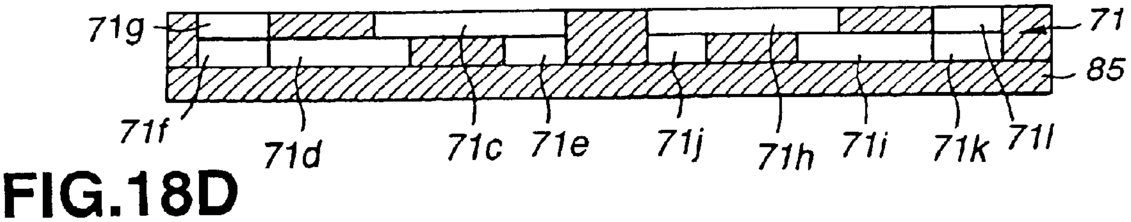
Figure 18D:
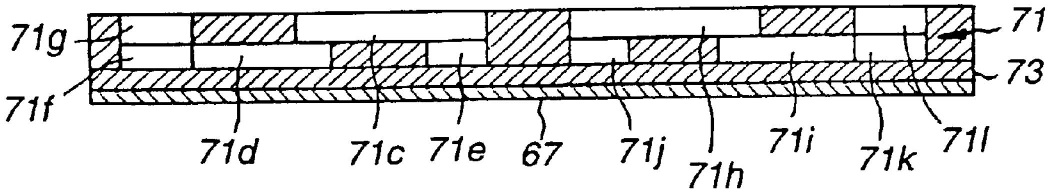

Then, the resists 83, 84 are removed, as shown in FIG. 18C. If, in this case, dry resist films are used as the resists 83, 84, an aqueous solution of sodium hydroxide with a concentration of not higher than 5% of sodium hydroxide is used as a removing agent. If liquid resist films are used as the resists 83, 84, a dedicated alkaline solution is used as a remover. After removing the resists 83, 84, a resin material 85 of, for example Neoflex (manufactured by MITSUI TOATSU KAGAKU KOGYO KK) having a thickness of approximately 50 $\mu$m and a glass transition temperature of not higher than 250° C. is bonded by thermal pressure bonding to the opposite side major surface 71$b$ of the ink pressurizing chamber forming member 71. This thermal pressure bonding is effected by applying a pressure of the order of 20 to 30 kgf/cm$^2$ at a press-working temperature of 230° C. By setting the condition for thermal pressure bonding in this manner, the bonding strength between the ink pressurizing chamber forming member 71 and the resin material 85 can be increased, while these can be bonded together efficiently.

Also, since the ink emission hole 73$a$ or the dilution liquid emission hole 73$b$ is not formed in this case in the resin material 85, the bonding step in the process of bonding the resin material 85 to the ink pressurizing chamber forming member 71 can be performed easily to the extent that highly accurate position matching is not required. Moreover, since the resin material 85 is bonded to the ink pressurizing chamber forming member 71 without using an adhesive, there is raised no problem of the adhesive stopping up the ink flow duct 71$d$ or the dilution liquid flow duct 71$i$.

The liquid repellant film 67 is then formed on the surface of the resin material 85 facing the ink pressurizing chamber forming member 71. The liquid repellant film 67 is preferably formed of a material which repels the ink and which produces no ink remaining affixed in the vicinity of the ink emission hole while producing no burrs without causing ink film delamination in case the ink emission hole 33$a$ is formed by excimer laser. Such material may be typified by the fluorine resin dispersed in a polyimide material (such as modified EEP material sold under the trade name of 958-207 by DUPONT; a polyimide based material having a hygroscopicity of 0.4% or less, such as polyimide based overcoat ink sold under the trade name of EPICOAT FS-100L and FP-100 by UBE KOSAN; and liquid-repellant polybenzoimidazole, such as coating type polybenzoimidazole material sold under the trade name of NPBI by HOECHIST AG.

Figure 18E:
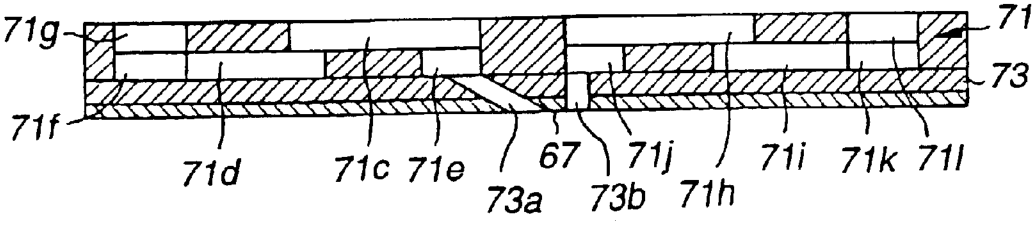

The resin material 85 is then irradiated perpendicularly with an excimer laser beam, from the side of the major surface 71$a$ of the ink pressurizing chamber forming member 71, via the dilution liquid pressurizing chamber 71$h$ and the dilution liquid inlet duct 71$j$, for forming the dilution liquid emission hole 73$b$ in the resin material 85, as shown in FIG. 18E. Also, the resin material 85 is irradiated perpendicularly with an excimer laser beam, from the side of the major surface 71$a$ of the ink pressurizing chamber forming member 71, via the ink pressurizing chamber 71$c$ and the ink inlet duct 71$e$, for forming the ink emission hole 73$a$ in the resin material 85 This gives the above-mentioned orifice plate 33.

Since the orifice plate 33 is formed of the resin material 85, the ink emission hole 73$a$ and the dilution liquid emission hole 73$b$ can be formed easily. The liquid repellant film 67 is formed of a material having excellent excimer laser working characteristics, the ink emission hole 73$a$ and the dilution liquid emission hole 73$b$ can be formed easily. Moreover, since the ink inlet duct 71$e$ and the dilution liquid inlet duct 71$j$ are larger in diameter than the ink emission hole 73$a$ and the dilution liquid emission hole 73$b$, position matching between the resin material 85 and the ink pressurizing chamber forming member 71 during laser working need not be strict, while it becomes possible to evade the risk of the light beam being shielded during laser working by the ink pressurizing chamber forming member 71.

Figure 19A:
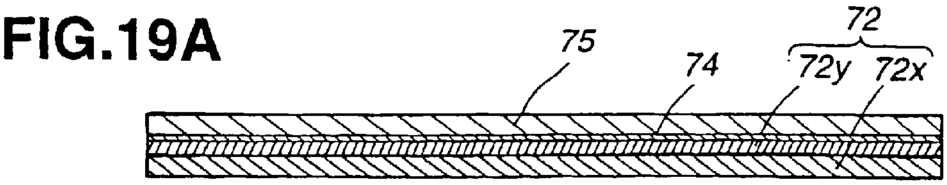

Then, a piezoelectric material 75 about 30 $\mu$m thick is bonded to the major surface of the second vibrating plate 72$y$ of the double-layered vibrating plate 72 via an electrically conductive adhesive 74, as shown in FIG. 19A. In this case, a pressure of the order of 20 to 30 kgf/cm$^2$ is preferably used for bonding in order to reduce the thickness of the electrically conductive adhesive to as small a value as possible. This stabilizes the electrical resistance of the junction portion between the piezoelectric material 75 and the vibrating plate 72 while assuring stable adhesion in view of strength.

On both sides of the piezoelectric material 43 is formed an electrically conductive film of, for example copper-nickel alloys, approximately 0.2 $\mu$m thick, for assuring electrical connection, by a thin-film forming method, such as sputtering. As the electrically conductive adhesive 74, an epoxy-based adhesive cured at room temperature, admixed with electrically conductive materials, such as carbon particles, for example, is used.

Figure 19B:
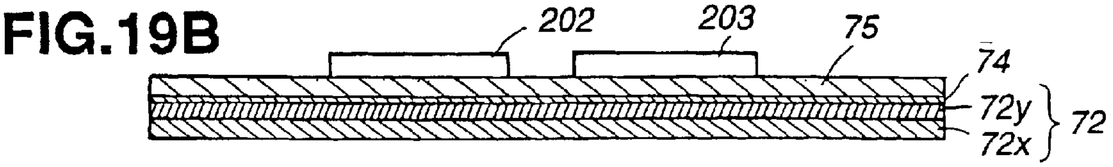

Then, resist materials 202, 203, shaped similarly to the ink pressurizing chamber 71$c$ and the dilution liquid pressurizing chamber 71$h$, are formed on the piezoelectric material 75, as shown in FIG. 19B. As these resist materials 202, 203, a resist for sandblasting, such as BF-405 or BF-403 (trade names) sold by TOKYO OKA, or a powder beam etching resist, may be used. By using these resist materials, the resolution of the order of 50 $\mu$m in terms of the minimum line width may be realized.

Figure 19C:
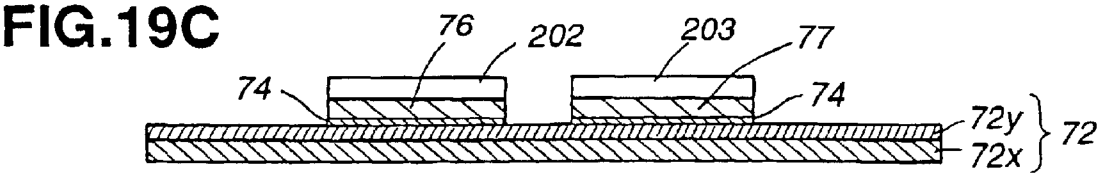

Then, using a sand-blasting device or a powder beam etching device, a solid-gaseous two-phase jet stream containing diamond particles 5 to 30 $\mu$m in size is sprayed onto the piezoelectric material 75 carrying the resist materials 202, 203 for processing the piezoelectric material 75 to a shape corresponding to that of the resist materials 202, 203 to produce first and second piezoelectric device 76, 77, as shown in FIG. 19C. By using fine diamond particles of the order of 5 to 30 $\mu$m, a value of 8 to 9 can be realized as the value of processing speed ratio to the copper material making up the second vibrating plate 32$y$ of the piezoelectric materials 76, 77 which later become the first and second piezoelectric device 76, 77. That is, the processing speed for the piezoelectric material is 8 to 9 times faster than that for the cop-per material. The result is that, in the processing process of the piezoelectric devices 76, 77 shown in FIG. 19C, the processing area can be limited to the copper material making up the second vibrating plate 72*y*.

Figure 19D:
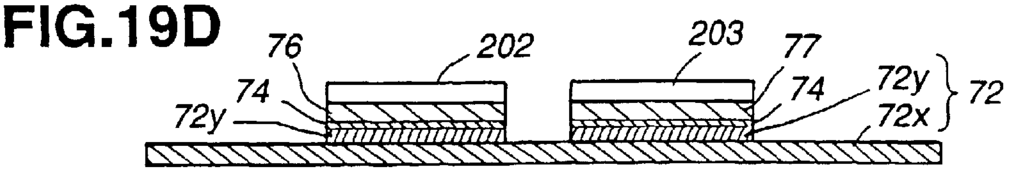

The vibrating plate 72, carrying the first and second piezoelectric devices 76, 77, is immersed in a ferric chloride solution, or a shower of the ferric chloride solution is sprayed onto the vibrating plate 72 carrying the piezoelectric devices 76, 77, for removing the portion of the second vibrating plate 72*y* not carrying the piezoelectric devices 76, 77 Since the first vibrating plate 72*x* is formed of a polyimide or titanium material, and hence is not attacked during the removal process by the aqueous solution of ferric chloride as the etching solution for the second vibrating plate 72*y*, only the second vibrating plate 72*y* is removed, as shown in FIG. 19D.

Figure 19E:
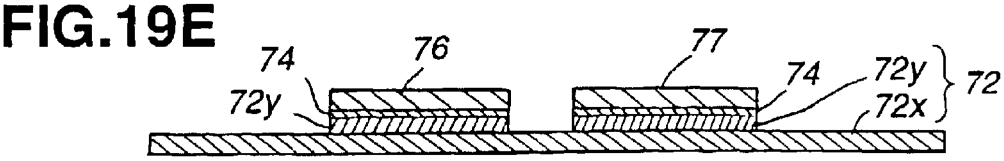

The resist materials 202, 203, left on the piezoelectric devices 76, 77, are then removed, using a dedicated removing solution, as shown in FIG. 19E.

Figure 20A:
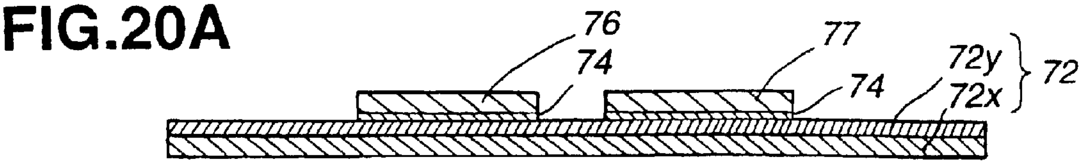
Figure 20B:
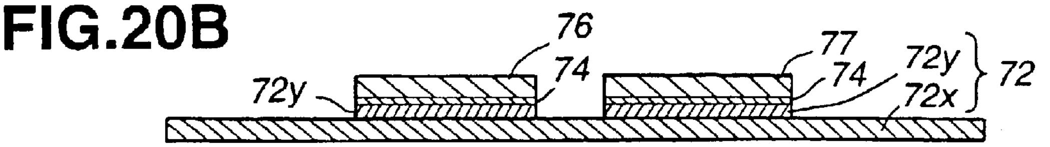

Although the above explanation has been made of removing the second vibrating plate 72*y*, using, as a mask, the resist materials 202, 203, used for forming the piezoelectric devices 76, 77, it is also possible to remove the resists 202, 203 before the step of removing the second vibrating plate 72*y*, as shown in FIG. 20A, and to remove the second vibrating plate subsequently, using the piezoelectric devices 76, 77 as a mask, as shown in FIG. 20B.

If the second vibrating plate 72*y* is removed using the resist material 201 as a mask, the electrode material formed on each side of the first and second piezoelectric devices 76, 77 can be protected more reliably, whereas, if the second vibrating plate 72*y* is removed after removal of the resist materials 202, 203, using the first and second piezoelectric devices 76, 77 as a mask, the etching can be improved in precision because the aqueous solution of ferric chloride as the etching solution for the second vibrating plate 72*y* can penetrate into the inside of a narrow groove more promptly.

Although the foregoing description has been made of using the double layer structure for the vibrating plate 32 comprised of the first and second vibrating plates 72*x* and 72*y* and removing the second vibrating plate 72*y*, at least one layer towards the first and second piezoelectric devices 76, 77 is etched off if the vibrating plate 72 is of the multilayered structure composed of three or more layers.

Figure 21A:
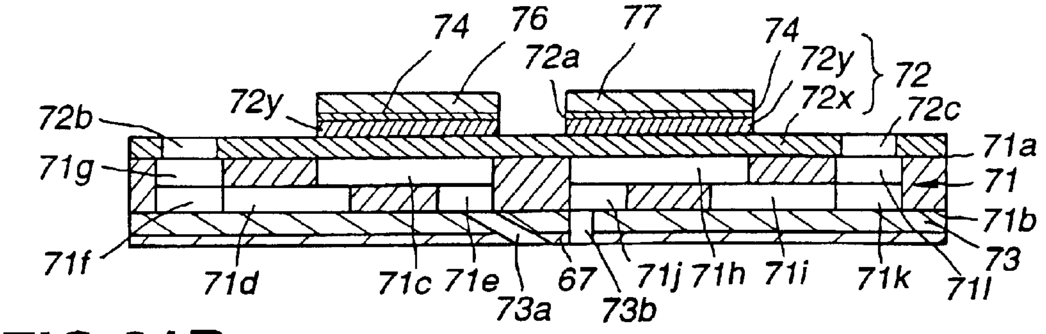

Next, the ink pressurizing chamber forming member 71 carrying the orifice plate 73 is bonded to the vibrating plate 72 carrying the first and second piezoelectric devices 76, 77, as shown in FIG. 21A. An epoxy-based adhesive may be used as an adhesive. If the polyimide material of Neoflex is used as the material for the first vibrating plate 72*x*, bonding may be achieved, without using the adhesive, by using a hot-press working process at a temperature of 220 to 230° C. under a pressure of 20 to 30 kgf/cm$^2$, by exploiting the adhesive properties of the polyimide material, thereby improving resistance against chemicals.

If a titanium material is used for the first vibrating plate 72*x*, which is used as an actuator for the printer, its resonance frequency can be raised for increasing the ink emission speed.

Figure 21B:
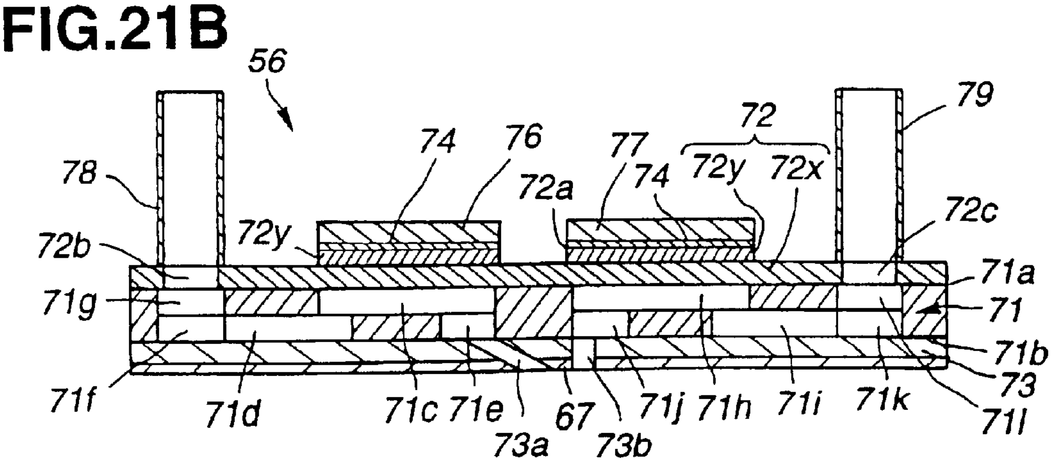

An ink supply duct 78 is then bonded to the site of the through-hole 72*b* of the vibrating plate 72, using, for example, an epoxy-based adhesive, as shown in FIG. 21B. This completes the 'carrier jet' printer head 56.

The above-described manufacture of the 'carrier jet' printer head 56 makes it possible to form the first and second piezoelectric devices 76, 77 to an optional shape inclusive of a linear shape, in contradistinction from the conventional practice in which the shape of the piezoelectric device is necessarily linear. The separation between neighboring piezoelectric devices 76, 77 can be set easily to 100 $\mu$m or less. This renders it possible to reduce the nozzle pitch in the printer device.

Moreover, in the conventional manufacturing method, abrasion to the tool needs to be taken into account in designing. In the manufacturing method of the present embodiment, there is no necessity of taking the abrasion of the blade into account, thus realizing a designing which places more emphasis on the ink emission performance.

Also, in the manufacturing method of the printer device of the present embodiment, substantially the entire surface of the piezoelectric material 75 bonded to the vibrating plate 72 can be split simultaneously, thus significantly reducing the processing time.

Other Embodiment In the above-described first embodiment, the method has been described in which the vibrating plate 32 carrying the piezoelectric device 35 is bonded to the pressurizing chamber forming member 31 carrying the orifice plate 33 to manufacture the ink jet print head 7. This invention, however, is not limited to this configuration. For example, it is also possible to bond the vibrating plate 32 to the pressurizing chamber forming member 31 carrying the orifice plate 33 and subsequently to form the piezoelectric device 35 on this vibrating plate 32, as shown in FIG. 22.

Figure 22A:
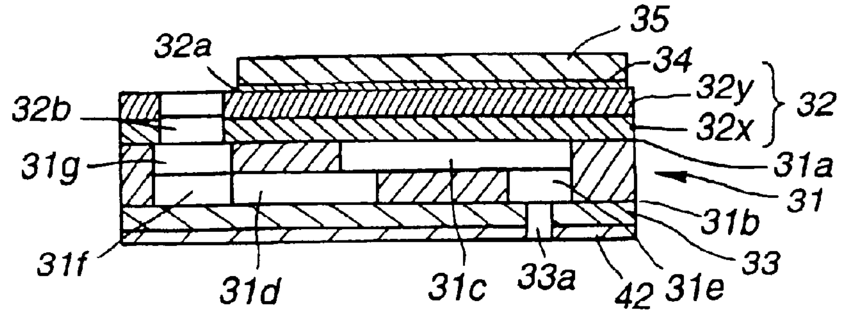

That is, a vibrating plate 32 and a piezoelectric material 43 of a dual-layer structure are bonded to the major surface 31*a* of the pressurizing chamber forming member 31 carrying the orifice plate 33, as shown in FIG. 22A.

Figure 22B:
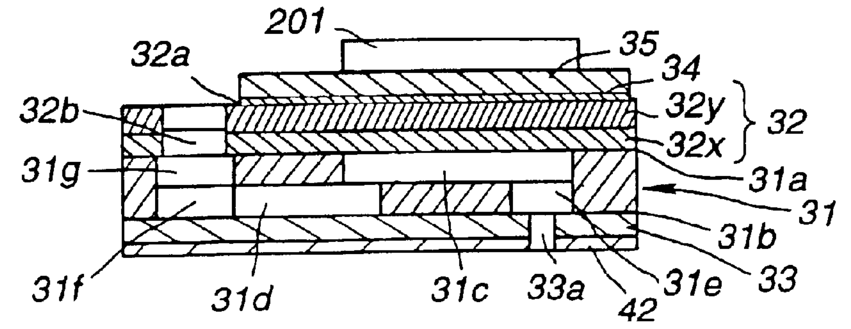
Figure 22C:
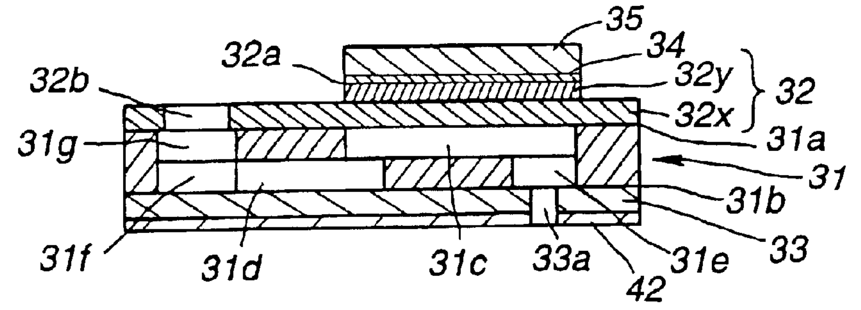
Figure 22D:
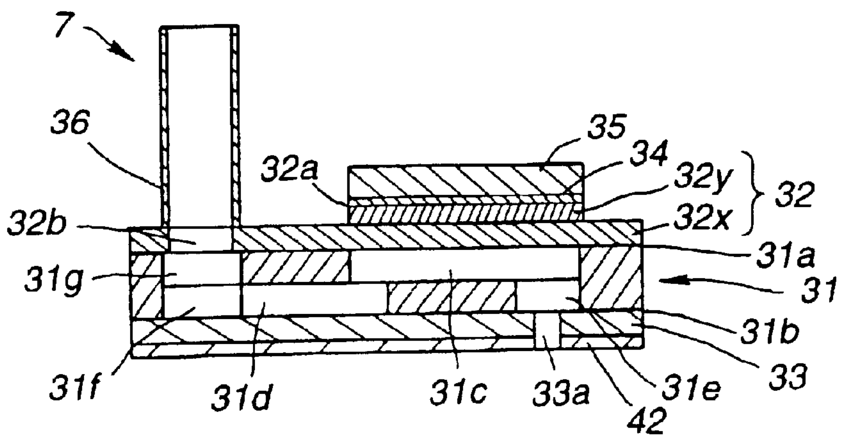
Figure 23:
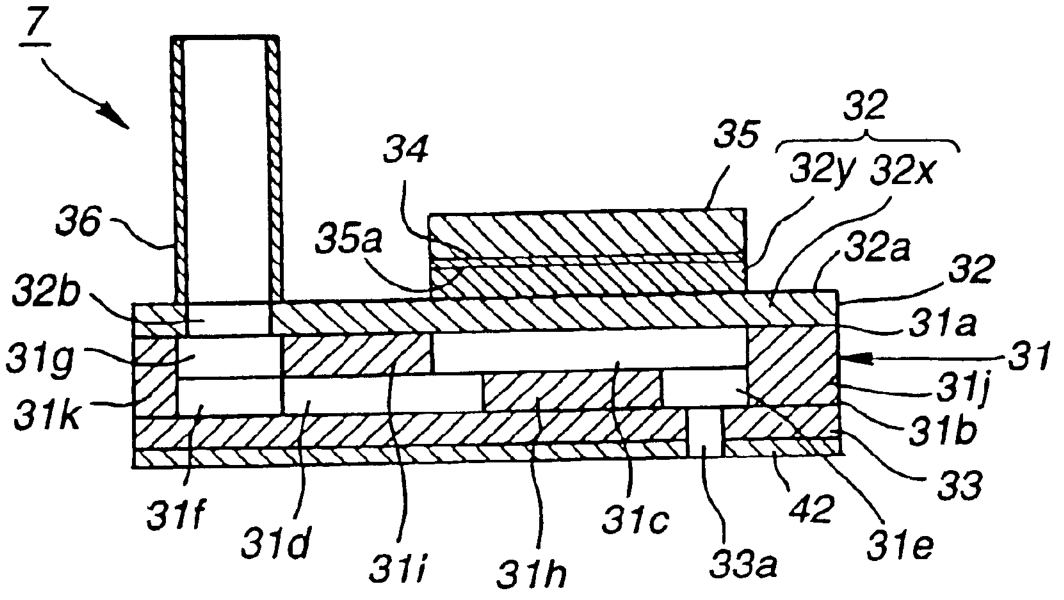
FIG. 23 is a longitudinal cross-sectional view of an ink jet printer head manufactured in accordance with a modification of the present invention, for illustrating the manufacturing method for this printer device.

Then, a pattern is formed on the resist material 201 on the piezoelectric material 43, as shown in FIG. 22B.

Then, using this resist material 201 as a mask, a piezoelectric device 35 shaped similarly to the resist material 201 is formed by powder beam etching or sandblasting, at the same time as the second vibrating plate 32*y* is removed by an etching process employing an aqueous solution of ferric chloride.

After formation of the piezoelectric device 35 and the second vibrating plate 32*y* to the desired shape, the ink supply duct 36 is bonded at the site of the through-hole 32*b* in the first vibrating plate 32*x*.

As in the first embodiment, the delamination process for the resist material 201 may be executed before or after the etching process employing an aqueous solution of ferric chloride. The method for bonding the vibrating plate 32 to the pressurizing chamber forming member 31 and the method for bonding the vibrating plate 32 to the piezoelectric device 35 may be the same as those used in the first embodiment. The method for bonding the vibrating plate 32 to the pressurizing chamber forming member 31 may precede the method for bonding the vibrating plate 32 to the piezoelectric device 35 or vice versa.

With the above-described method, position matching accuracy can be improved because the position matching accuracy for the piezoelectric device 35 is equivalent to the patterning precision for the resist material 201.

This method can be used for manufacturing the 'carrier jet' printer device 50, explained by way of the second embodiment, with similar effects.

In the above-described first embodiment, the vibrating plate 32 is substantially of the same size as the pressurizing chamber forming member 31, and the through-hole 32*b* is formed in the vibrating plate 32 for connection to the ink supply duct 36. However, the present invention is not limited to this embodiment, such that similar effects can be obtained even if the vibrating plate 32 is smaller than the pressurizing chamber forming member 31 provided that the vibrating plate 32 is at least just large enough to cover the ink pressurizing chamber 31*c*.

That is, the ink jet print head 7 may be configured so that the vibrating plate 32 is not present around the connection hole 31*g* provided in the pressurizing chamber forming member 31. Since the through-hole 32*b* formed in the ink jet print head 7 of the first embodiment need not be provided in the present ink jet print head 7, the step of punching the vibrating plate 32 can be omitted, while the bonding area between the vibrating plate 32 and the pressurizing chamber forming member 32*v* can also be reduced. Moreover, if the piezoelectric device 35 is formed after bonding the vibrating plate 32 to the pressurizing chamber forming member 31 as described above, the position matching reference can be directly provided in the pressurizing chamber forming member 31, thus further improving position matching accuracy.

Meanwhile, this method can be applied to the manufacturing method for the 'carrier jet' printer device 50, explained by way of the second embodiment, thus realizing similar effects.

In the above-described first embodiment, the orifice plate 33 formed of Neoflex having a glass transition temperature of not higher than 250° C. However, the present invention is again not limited to this configuration. That is, the effects similar to those realized with the above-described first embodiment can be realized using an orifice plate 91 shown in FIG. 24 in place of the orifice plate 33 used in the first embodiment.

This orifice plate 91 is made up of a first resin material 92 of Capton (manufactured by DU PONT) having a thickness of approximately 125 μm and a glass transition temperature of not higher than 250° C. and a second resin material 93 of Neoflex having a thickness of approximately 7 μm and a glass transition temperature of not higher than 250° C. The second resin material 93 of Neoflex is coated on one of the major surfaces of the first resin material 92. If this orifice plate 91 is used, an ink emission hole 33*a* communicating with the ink inlet duct 31*e* is formed in the orifice plate 91.

Since the orifice plate 91 is thicker than the orifice plate 33 used in the first embodiment, a higher strength can be achieved than if the orifice plate 33 is used. Moreover, since the ink emission hole 33*a* can be increased in length, the emitted ink liquid droplets can be improved in direction characteristics.

Although the above-described second embodiment refers to a case of using an orifice plate 73 of Neoflex having the glass transition temperature not higher than 250° C., the present invention is not limited to this configuration. That is, the effects similar to those realized with the above-described first embodiment can be realized using an orifice plate 91 shown in FIG. 21 in place of the orifice plate 73 used in the second embodiment.

In particular, if the orifice plate 91 is used in the 'carrier jet' printer head 56, a certain allowance may be endowed to the angle of inclination of the ink emission hole 73*a*, while the separation between the ink pressurizing chamber 71*c* and the dilution liquid pressurizing chamber 71*h* can be easily enlarged thus assuring positive prevention of ink leakage and leakage of the dilution liquid.

In this case, the ink emission hole 73*a* an the dilution liquid emission hole 73*b* communicating with the ink inlet hole 71*e* and with the dilution liquid inlet duct 71*j*, respectively, are formed in the orifice plate 91.

Figure 24:
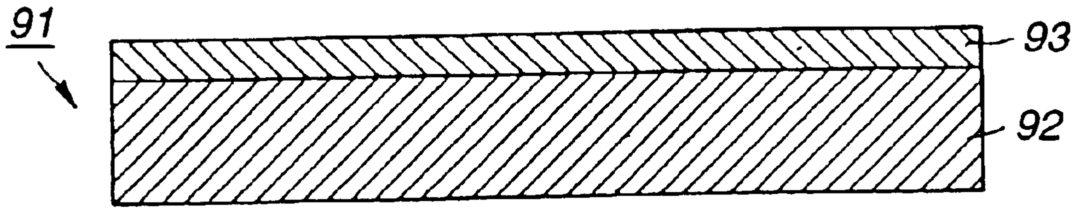
FIG. 24 is a longitudinal cross-sectional view of a resin material used in the present embodiment for illustrating the manufacturing method of a printer device according to a further modification of the present invention.
Figure 25:
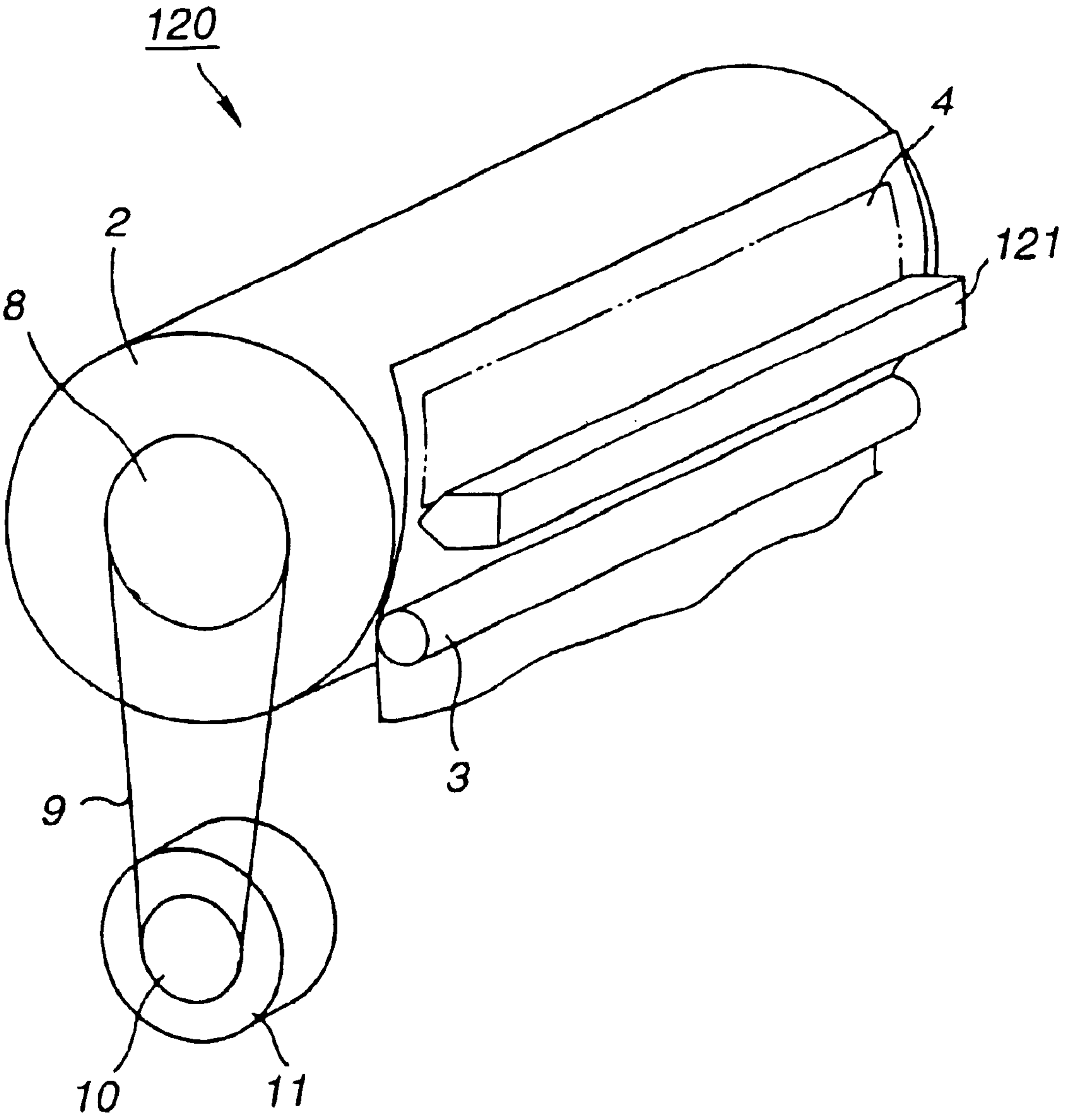
FIG. 25 is a perspective view showing essential portions of a line type printer device.
Figure 26:
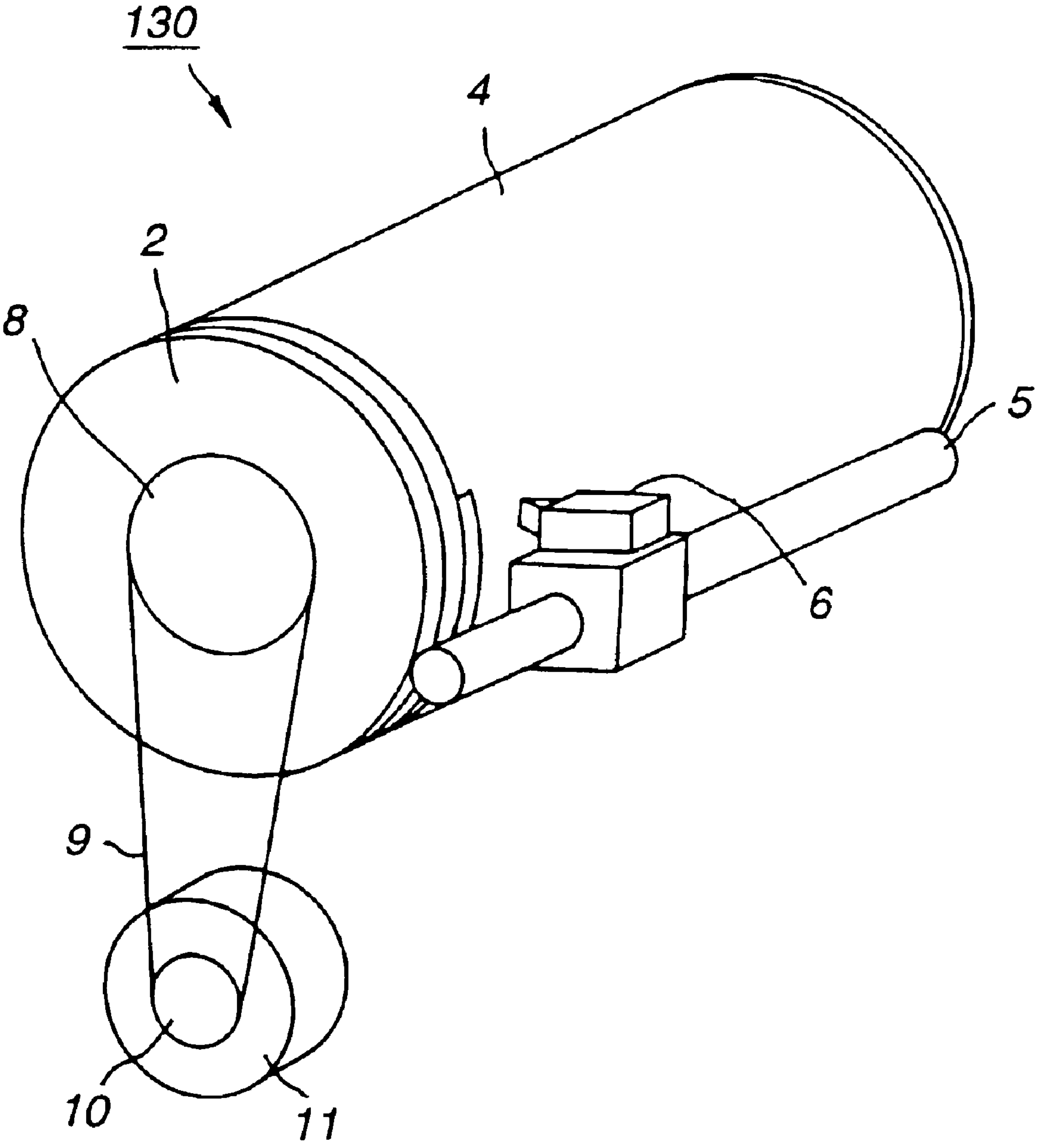
FIG. 26 is a perspective view showing essential portions of a drum rotation type printer device.

In the above-described first and second embodiments, the present invention is applied to the serial type 'carrier jet' printers 1 and 50. However, the present invention is not limited to this configuration. For example, the present invention can be applied to a line type printer device 120 shown in FIG. 25 or to a drum rotation type printer device 130 shown in FIG. 26. In FIGS. 24 and 26, parts or components similar to those of the serial type 'carrier jet' printer device 1 shown in FIG. 2 are denoted by the same reference numerals.

In the line type printer device 120, a line head 121 comprised of a linear array of a large number of printer heads is mounted stationarily for extending in the axial direction. This line type printer device 120 is configured for simultaneously printing one row of letters by the line head 121 and for rotating the drum by one row of letters on completion of letter printing for a given row of letters to proceed to the letter printing of the next row. There may be contemplated such a method in which all lines are printed collectively or divided in plural blocks, or printing is made every other row.

In the drum rotation type printer device 130, the ink is emitted from the print head 6 in synchronism with drum rotation to emit the ink from the print head 6 to generate an image on the printing paper sheet 4. When the drum 2 completes one revolution to complete one row of letters on the printing paper sheet 4 in the circumferential direction, the feed screw 5 is rotated about its axis to move the printer head 6 by one pitch to proceed to next printing. In this case, the drum 2 and the feed screw 5 can be rotated simultaneously to move the printer head 6 slowly simultaneously with printing. If the printer head is a multi-ink-emission-hole type head, or the same place is printed repeatedly, printing is made spirally whist the drum 2 and the feed screw 5 are rotated simultaneously in operative association with each other.

In the above-described first and second embodiments, the ink pressurizing chamber forming member 31 and the pressurizing chamber forming member 71 are fabricated using metal members 38, 82 of, for example, stainless steel, approximately 0.1 mm in thickness. The present invention, however, is not limited to this configuration because various other numerical figures may be used as the thicknesses of the metal members 38, 82. Since various chambers and holes in the ink pressurizing chamber forming member 31 and the pressurizing chamber forming member 71 are formed by etching, as described above, the thicknesses of the metal members 38, 82 are desirably set to not less than 0.07 mm. By setting the thicknesses of the metal members 38, 82 to not less than 0.07 mm, sufficient strength may be afforded to the metal members 38, 82 to enable the pressure increase in the ink pressurizing chambers 31*c* or 71*c* or in the dilution liquid pressurizing chamber 71*h*.

In the above-described embodiments, the orifice plates 33, 73 are thermally pressure-bonded to the ink pressurizing chambers 31*c*, 71*c* at a press-working temperature of approximately 230° C. under a pressure of 20 to 30 kgf/cm$^{2.}$ The present invention, however, is not limited to this configuration, such that various other numerical values may be used for thermally pressure bonding the orifice plates 33, 73 to the ink pressurizing chambers 31, 71 insofar as sufficient adhesion strength is assured.

In the above-described first and second embodiments, the excimer laser is used for forming the ink emission hole 33*a* in the resin material 41 and for forming the ink emission hole 73*a* and the dilution liquid emission hole 73*b* in the resin material 85. The present invention, however, is not limited to this configuration because various other lasers, such as carbonic gas laser, may be used to form the ink emission hole 33*a*, ink emission hole 73*a* and the dilution liquid emission hole 73*b*.

In the above-described first and second embodiments, the ink pressurizing chamber 31*c* and the ink pressurizing chamber 71*c* are used as ink chambers in which the ink is charged to set a pre-set pressure. The present invention, however, is not limited to this configuration such that various other ink chambers may be used.

In the above-described first and second embodiments, the ink flow duct 31*d* and the ink flow duct 71*d* are used as ink flow ducts formed obliquely to the arraying direction of the ink chambers and adapted for supplying the ink supplied from the ink supply source to the ink chambers. The present invention, however, is not limited to this configuration such that various other ink flow ducts may be used.

Also, in the above-described first and second embodiments, the ink emission hole 33*a* and the ink emission hole 73*a* are used as the ink emission holes for emitting the ink from the ink chambers onto the recording medium when the pressure is applied to the respective ink flow ducts. The present invention, however, is not limited to this configuration such that various other ink emission holes may be used.

In the above-described second embodiment, the dilution liquid pressurizing chamber 71*h* is used as a dilution liquid pressurizing chamber into which is charged and pressurized the dilution liquid which is mixed with the ink during emission. The present invention, however, is not limited to this configuration such that various other dilution liquid chambers may be used.

In the above-described second embodiment, the dilution liquid flow duct 71*i* is used as the dilution liquid flow duct formed at an angle relative to the arraying direction of the dilution liquid chamber and which is adapted for supplying the dilution liquid supplied from the dilution liquid supply source to the respective dilution liquid chambers. The present invention, however, is not limited to this configuration such that various other dilution liquid flow ducts may be used.

In the above-described second embodiment, the dilution liquid emission hole 73*b* is used as the dilution liquid emission hole via which the dilution liquid supplied from the dilution liquid chambers is emitted to the recording medium when the pressure is applied to the respective dilution liquid flow ducts. The present invention, however, is not limited to this configuration such that various other dilution liquid emission holes may be used.

In the above-described second embodiment, the ink pressurizing chamber forming member 31 and the pressurizing chamber forming member 71 are used as metal plates in which the ink chambers and ink ducts are formed by punching. The present invention, however, is not limited to this configuration such that various other dilution metal plates formed with the ink chambers and ink ducts may be used.

In the above-described second embodiment, the orifice plates 33, 73 are used as the plate-shaped resin members formed with ink emission holes. The present invention, however, is not limited to this configuration such that various other dilution liquid emission holes may be used.

In the above-described second embodiment, the orifice plates 33, 73 formed of Neoflex having a thickness of approximately 50 $\mu$m and the glass transition temperature of not higher than 250° C. are used as the resin members having the glass transition temperature of not higher than 250° C. The present invention, however, is not limited to this configuration such that various other resin members may be used if the glass transition temperature thereof is not higher than 250° C.

In the above-described second embodiment, the orifice plate 91 is used as the layered resin material comprised of a first resin material with the glass transition temperature of not lower than 250° C. and a second resin material with the glass transition temperature of not higher than 250° C. The present invention, however, is not limited to this configuration since various other resin members may be used as the layered resin material comprised of the first resin material with the glass transition temperature of not lower than 250° C. and the second resin material with the glass transition temperature of not higher than 250° C.

Also, in the above-described first and second embodiments, the ink buffer tank 31*f* and the ink buffer tank 71*f* are used as ink delivery means for delivering the ink supplied from the ink supply source. The present invention, however, is not limited to this configuration since various other ink delivery means may be used.

Further, in the above-described first and second embodiments, the ink buffer tank 71*f* is used as dilution liquid delivery means for delivering the dilution liquid supplied from the dilution liquid supply means for mixing with the ink at the time of emission. The present invention, however, is not limited to this configuration since various other dilution liquid delivery means may be used.

What is claimed is:

1. In a method of manufacturing a printer device having a pressuring chamber communicating with a liquid emission hole, a vibrating plate forming a portion of a sidewall section of said pressuring chamber, and a piezoelectric device arranged in contact with the vibrating plate, in which a liquid in said pressurizing chamber is emitted via said liquid emission hole by displacement of said piezoelectric device and the vibrating plate, wherein the improvement resides in that said vibrating plate has first and second layers; and in that the manufacturing method comprises a step of forming the piezoelectric device in contact with said second layer;

a step of processing said piezoelectric device by spraying powders or particles; and a step of removing an area of said second layer not covered by said piezoelectric device by wet etching.

* * * * *